US012420401B2

(12) United States Patent
Luo et al.

(10) Patent No.: US 12,420,401 B2
(45) Date of Patent: Sep. 23, 2025

(54) MULTIMODAL END-TO-END LEARNING FOR CONTINUOUS CONTROL OF EXOSKELETONS FOR VERSATILE ACTIVITIES

(71) Applicant: North Carolina State University, Raleigh, NC (US)

(72) Inventors: Shuzhen Luo, Raleigh, NC (US); Hao Su, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 172 days.

(21) Appl. No.: 18/375,797

(22) Filed: Oct. 2, 2023

(65) Prior Publication Data
US 2024/0116170 A1  Apr. 11, 2024

Related U.S. Application Data

(60) Provisional application No. 63/411,754, filed on Sep. 30, 2022.

(51) Int. Cl.
*B25J 9/00* (2006.01)
*B25J 9/16* (2006.01)

(52) U.S. Cl.
CPC ........... *B25J 9/0006* (2013.01); *B25J 9/1615* (2013.01); *B25J 9/163* (2013.01); *B25J 9/1633* (2013.01)

(58) Field of Classification Search
CPC ........ B25J 9/0006; B25J 9/1615; B25J 9/163; B25J 9/1633; G05B 2219/40305
See application file for complete search history.

(56) References Cited

U.S. PATENT DOCUMENTS

| | | | | |
|---|---|---|---|---|
| 11,345,040 | B2* | 5/2022 | Oleynik | G05B 19/4183 |
| 11,583,358 | B2* | 2/2023 | Peine | A61B 34/77 |
| 11,590,656 | B2* | 2/2023 | Islam | G06T 7/80 |
| 11,651,249 | B2* | 5/2023 | Azmandian | G06N 5/04 |
| | | | | 706/12 |
| 11,667,031 | B2* | 6/2023 | Adachi | B25J 9/1697 |
| | | | | 700/253 |
| 11,893,789 | B2* | 2/2024 | Hu | G06T 3/4046 |
| 2011/0067521 | A1* | 3/2011 | Linn | B25J 15/0009 |
| | | | | 74/490.06 |

(Continued)

OTHER PUBLICATIONS

Yu, et al., "Quasi-direct drive actuation for a lightweight hip exoskeleton with high backdrivability and high bandwidth", IEEE Transactions on Mechatronics, Apr. 2020.

(Continued)

*Primary Examiner* — Bhavesh V Amin
(74) *Attorney, Agent, or Firm* — Thomas | Horstemeyer, LLP

(57) ABSTRACT

Various examples are provided related to continuous control of exoskeletons. In one example, a method includes obtaining IMU sensor signals associated with an exoskeleton attached to a limb of a subject; generating an exoskeleton control signal in response to the IMU sensor signals, the exoskeleton control signal generated by a control policy neural network trained offline from the exoskeleton using musculoskeletal human modeling and exoskeletal modeling with dynamics randomization; and controlling joint torques of the exoskeleton exerted on the subject based upon the exoskeleton control signal.

18 Claims, 14 Drawing Sheets

(56) References Cited

U.S. PATENT DOCUMENTS

| | | | | |
|---|---|---|---|---|
| 2013/0345875 | A1* | 12/2013 | Brooks | B25J 9/1671 |
| | | | | 700/258 |
| 2019/0202058 | A1* | 7/2019 | Dai | B25J 9/1671 |
| 2019/0291277 | A1* | 9/2019 | Oleynik | B25J 9/1669 |
| 2023/0414440 | A1* | 12/2023 | Young | A61H 3/00 |
| 2024/0116170 | A1* | 4/2024 | Luo | B25J 9/163 |

OTHER PUBLICATIONS

Huang, et al., "Modeling and Stiffness-based Continuous Torque Control of Lightweight Quasi-Direct-Drive Knee Exoskeletons for Versatile Walking Assistance", IEEE Transactions on Robotics, vol. 38, No. 3, Jun. 2022.

Zhu, et al., "Design and Backdrivability Modeling of a Portable High Torque Robotic Knee Prosthesis With Intrinsic Compliance For Agile Activities", IEEE/ASME Transactions on Mechatronics, Jun. 2022.

Jang, et al., "Online gait task recognition algorithm for hip exoskeleton", Sep. 2015 IEEE/RSJ International Conference on Intelligent Robots and Systems (IROS) (pp. 5327-5332).

* cited by examiner

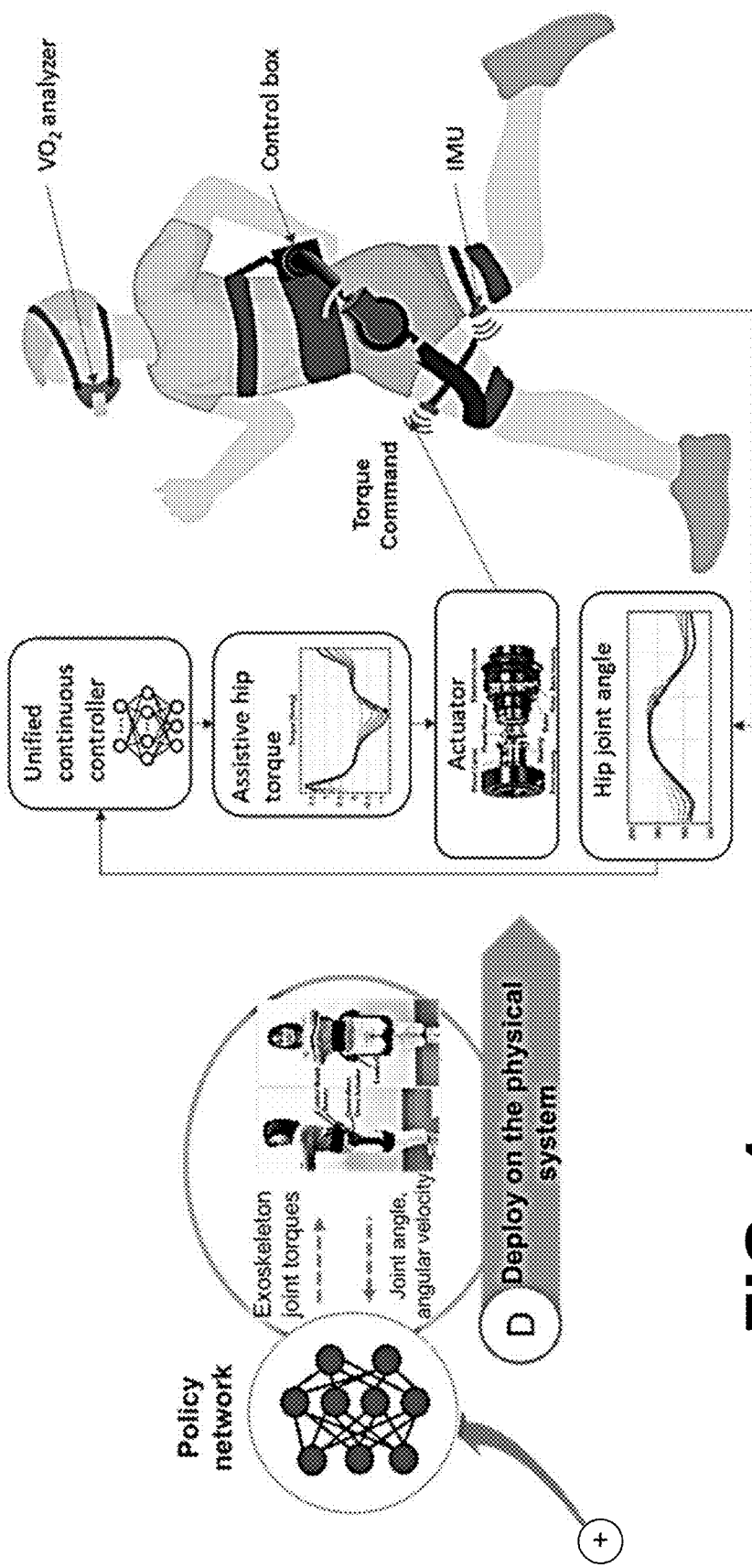

MULTIMODAL END-TO-END LEARNING FOR CONTINUOUS CONTROL OF EXOSKELETONS FOR VERSATILE ACTIVITIES

CROSS REFERENCE TO RELATED APPLICATIONS

This application claims priority to, and the benefit of, U.S. provisional application entitled "Multimodal End-to-End Learning for Continuous Control of Exoskeletons for Versatile Activities" having Ser. No. 63/411,754, filed Sep. 30, 2022, which is hereby incorporated by reference in its entirety.

STATEMENT REGARDING FEDERALLY SPONSORED RESEARCH OR DEVELOPMENT

This invention was made with government support under grant numbers CMMI1944655 and CMMI2227091 awarded by the National Science Foundation. The government has certain rights in the invention.

BACKGROUND

Through evolution, humans prefer to walk and run in an effective manner that minimizes the metabolic cost of transport. Walking and running are generally considered distinct gait modes with strikingly different biomechanics and energetics. The district biomechanics difference in walking and running makes it a great challenge for exoskeletons to lower wearers' metabolic expenditure effectively.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2C illustrate examples of an experiment platform, measuring motions, metabolisms and torque profiles, in accordance with various embodiments of the present disclosure.

DETAILED DESCRIPTION

Figure 1:
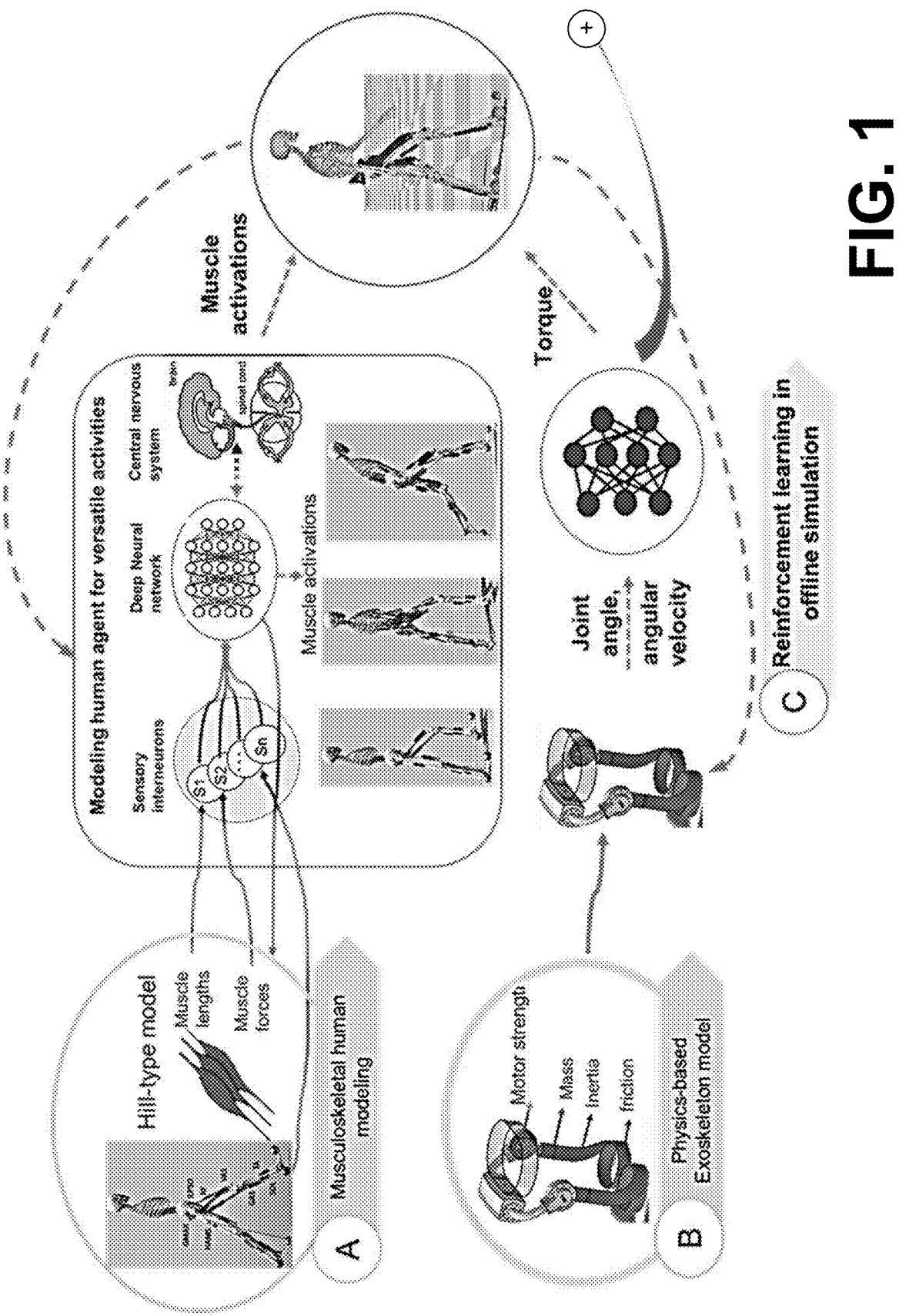
FIG. 1 illustrates an example of an approach for end-to-end, deep reinforcement learning-based control of exoskeletons, in accordance with various embodiments of the present disclosure.

Disclosed herein are various examples related to continuous control of exoskeletons. State-of-the-art control for exoskeleton assistance mainly focus on common hierarchical torque control rules: first estimate gait phase and parameters (e.g., speed, timing of leg swing) from user's prior steps and then generate assistive torques with many control parameters tuning. These designs have escalated in complexity while falling short of the generality and efficiency of the controller. Reference will now be made in detail to the description of the embodiments as illustrated in the drawings, wherein like reference numbers indicate like parts throughout the several views.

Here, a novel end-to-end, intrinsic state-dependent continuous controller is proposed for gait assistance without phase estimation and task classification in versatile activities. A method for training a deep neural network using deep reinforcement learning algorithm in offline simulation and transferring it to a hip exoskeleton system is introduced. Using control policies trained in a human-exoskeleton simulation environment, the hip exoskeleton is able to provide continuous and optimal torque assistance in walking and running that minimizes muscle effort without any gait phase estimation and task classification that go beyond what had been achieved with prior methods.

A novel deep neural network (DNN) can be configured to control exoskeletons for gait assistance without phase estimation or task classification in versatile activities. In particular, the DNN can be trained so as to allow AI to provide torque estimation for the gait assistance without the need for phase or gait estimation. Three DNNs can be used for training: motion imitation, muscle coordination, and an exoskeleton control policy.

The efficacy of the proposed continuous assistance controller was experimentally validated by measuring the metabolic energy expenditure during a variety of walking and running conditions such as slow, normal, fast, uphill, and running. Optimized torque patterns from a hip exoskeleton reduced metabolic energy consumption by 24.2±7.4% compared to baseline condition.

An end-to-end, deep reinforcement learning-based control method is proposed for autonomously learning real-time optimal torque profiles based on the user's current kinematic states without intermediate estimation. FIG. 1 illustrates an example of the proposed approach and experiment platform. Muscle strength randomization can be considered during the musculoskeletal human modeling process (A of FIG. 1) to model the human variations. Model uncertainties of the exoskeleton (B of FIG. 1) such as mass, inertia, friction and motor strength can be estimated. A hip exoskeleton control policy can involve training (C of FIG. 1), which integrates a muscle-actuated human controller to produce the realistic interaction forces from the exoskeleton assistance. The trained policy can be deployed (D of FIG. 1) directly on the physical exoskeleton system.

The corresponding mapping can be learned from a deep neural network in an end-to-end manner-from kinematic state (from IMU sensors) to the resulting real-time, optimal torques for the exoskeleton. This continuous controller is an end-to-end method (IMU sensor signals to robot control commands) and does not require switching among multiple gait phases and tasks. To date, end-to-end learning control for the exoskeleton has never been investigated. End-to-end learning control for the exoskeleton system is challenging due to the complex nature of the human-exoskeleton interaction, including the nonlinear characteristics of the interaction and resulting dynamic uncertainties. The end-to-end control policy of the exoskeleton trained in the simulation may not be able to be applied in the real exoskeleton due to the gap between the simulation and reality. Human kinematics variability in different individuals could also cause divergent responses to the controller. Therefore, most of the RL-based control research works still are limited to computer simulation.

To overcome this limitation, the end-to-end, deep neural network-based controller of the exoskeleton can be trained in an offline human-exoskeleton simulation framework (C of FIG. 1), which involves a muscle-actuated human controller to do versatile activities (walking and running) and produce the realistic interaction forces from the exoskeleton assistance. An actor-critic deep neural network of the exoskeleton controller can be designed to learn an optimal continuous torque profile policy concerning the kinematic input state from IMU sensors to minimize human muscle effort. The deep neural network-based controller of the exoskeleton is jointly learned with the muscle-actuated human controller in simulations to achieve maximum rewards in deep RL. To account for the human variability in different individuals for realizing the sim-to-real transfer, dynamics randomization including human muscle strengths randomization and robot dynamics randomization (A and B of FIG. 1) can be leveraged. By simply scaling the maximum isometric forces of all muscles or selected muscles within prescribed ranges, different muscle forces of human-exoskeleton interactions due to human variability can be simulated. The learned deep neural network-based control policy of the exoskeleton can then be directly transferred from the simulation to a real hip exoskeleton (D of FIG. 1).

Deep neural network, reinforcement learning is rarely investigated in the human-machine system due to the difficulty of the sim-to-real control policy transfer. Most of the RL-based control research works are still limited to computer simulation in robot control. This disclosure represents the first investigation of a deep neural network, reinforcement learning-enabled control framework in the human-machine system. As a generic and efficient learning framework, the proposed methodology can also shed light on similar problems for other assistive wearable machines, such as other lower limb or upper limb exoskeletons or prosthesis. These devices are also in need of identifying the optimal torque profile for able-bodied subjects or subjects with different neurological conditions (e.g., muscle weakness) to supplement their joint loading or improve joint range of motion. As demonstrated, application of the proposed approach to other human-machine systems can be valuable because this methodology does not need prior human-intensive testing. Specific modifications regarding problem formulations or implementations are considered before the translations, such as defining states (input of the neural network), actions (output of the neural network), and rewards (control objective) for each application.

In this disclosure, the highest metabolic reduction reported to date is presented with a lightweight, portable hip exoskeleton. Six subjects were recruited to participate in the experiment to evaluate the performance of the hip exoskeleton during walking and running. The resultant torque profile without the intermediate estimation was continuous and had no jerky control behavior at different speed walking and running than that of state-of-the-art. The device was found to reduce the metabolic rate of walking, running, and inclined walking by 24.9%, 34.02%, and 16.40% compared with the no-exoskeleton condition. It is believed that the results of the study set a new stage for applying artificial intelligence (AI) to the human-machine interaction system and further the knowledge of wearable robots to assist able-bodied locomotion in a practical and efficient manner.

FIG. 2A illustrates an example of the experiment platform, measuring motions, and metabolism. The learned state-based control policy from the simulation was directly deployed on the physical system (D of FIG. 1). While a participant is walking and running with the hip exoskeleton, a portable actuation system generates assistive hip flexion/extension torque. The exoskeleton assistive torque (load cells), segment motions (IMUs), and metabolic rate (indirect calorimetry) were measured. The learned state-based control policy was directly deployed on the physical system. The proposed method is computationally efficient at runtime. Inference of the simple neural network was found to take 25 μs on a single CPU thread, which corresponds to about 0.1% of the available onboard computational resources on the exoskeleton used in the experiments. A single learned control policy manifests vastly consciousness during different activities without any control parameters tuning. It was first evaluated in walking, inclined walking and running. The learned control policy can be adaptive to different walking and running speeds for different subjects without any task classification, phase detection and control parameters tuning.

Figure 2B:
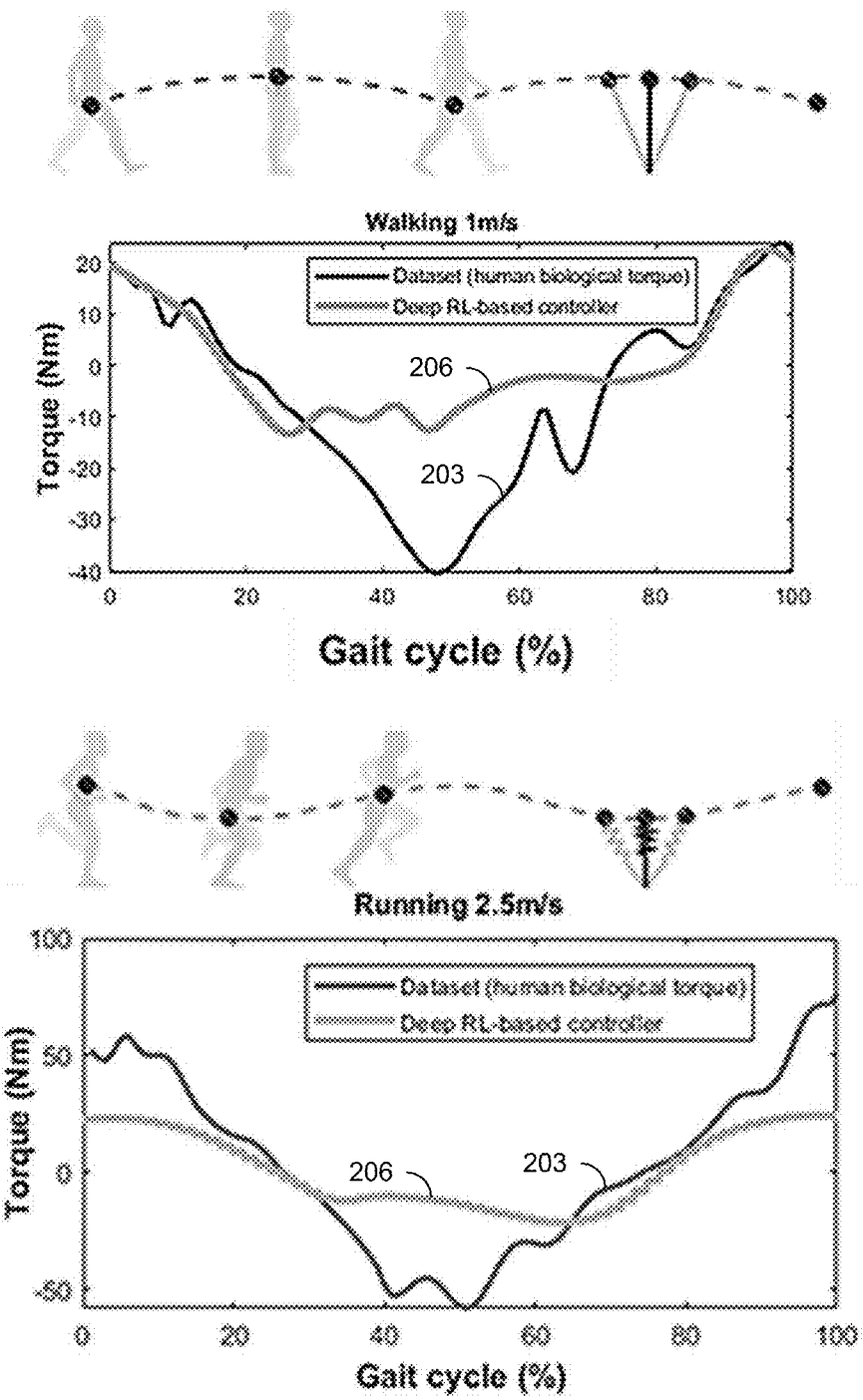
Figure 2C:
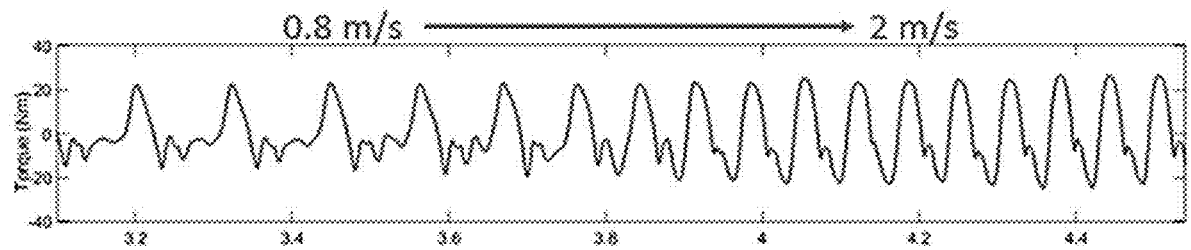

Treadmill experiments were conducted at walking and running speeds ranging from 0.5 to 3.0 m s$^{-1}$ and at gradients ranging from −10% to +20% with eight participants of different age. During the online validation trials, the learned control policy based on deep RL generalized well to changes in walking and running speed. A single control policy can instantaneously update the assistance profile in response to the kinematics sensory state (joint angle and angular velocity), which allows quick adaptations to change in walking and running patterns. FIG. 2B shows examples of continuous torque profiles during versatile walking and running. The lines represent exoskeleton assistance torque versus gait cycle. Lines 203 show the hip biological data and lines 206 show the generated optimal and continuous torque from deep RL-based controller. As shown in FIG. 2C, the proposed end-to-end, deep NN-based controller without any phase estimation can generate the continuous torque profile during different speeds in walking and running.

Data collection—metabolic cost. Indirect calorimetry (VO2 Master Analyzer, VO2 Master Health Sensors Inc, Canada) was used to measure $O_2$ consumption and $CO_2$ production. Participants were asked to refrain from alcohol, caffeine and strenuous activities for twelve hours before the study and fast for two hours before the study. We calculated the metabolic rate was calculated based on $O_2$ data gathered from the last two minutes of each condition using the Brockway equation. Respiratory output was calculated as $y(t)=0.278 \cdot VO_2(t)+0.075 \cdot VCO_2(t)$, where y(t) is the respiratory response in Watts and $VO_2(t)$ and $VCO_2(t)$ are volumetric flow rates in mL/min. Net metabolic cost for each condition was obtained by subtracting the standing metabolic power from the metabolic power of each condition, and then it was normalized by the body mass of each participant. First No-exo and second No-exo metabolic power were averaged.

Data collection—electromyography (EMG). The EMG collected from the rectus femoris (RF) (hip flexor) and biceps femoris (BF) (hip extensor) muscles were used to examine the subject's effort during walking. Raw EMG signals were collected. EMG amplitude was normalized by the average of corresponding EMG peaks without wearing the hip exoskeleton. The RMS value was calculated from each normalized curve from the last gait cycles of walking data and the values for the no-exo (walking without wearing exoskeleton) and assist-on (walking with wearing exoskeleton) were compared.

Figure 3A:
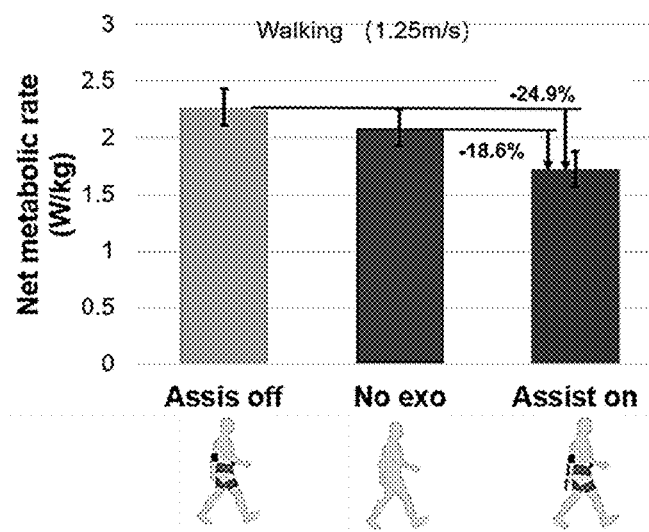
FIGS. 3A-3F illustrate examples of exoskeleton control test results, in accordance with various embodiments of the present disclosure.
Figure 3B:
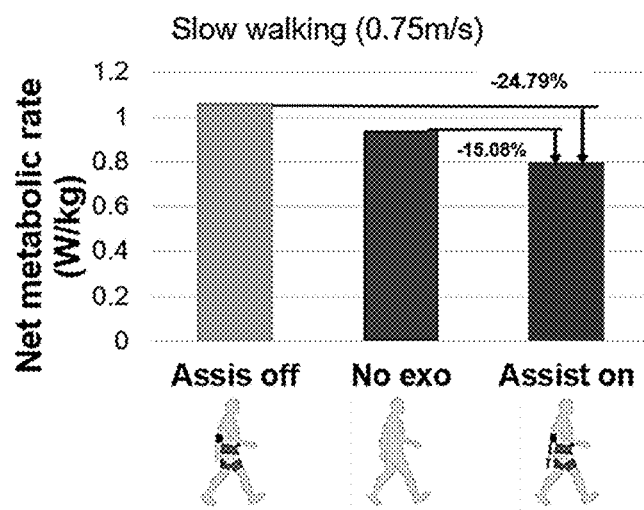
Figure 3C:
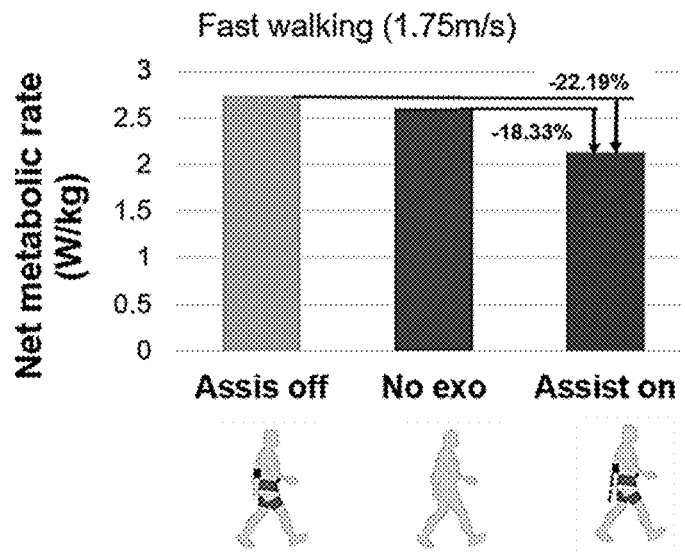
Figure 3D:
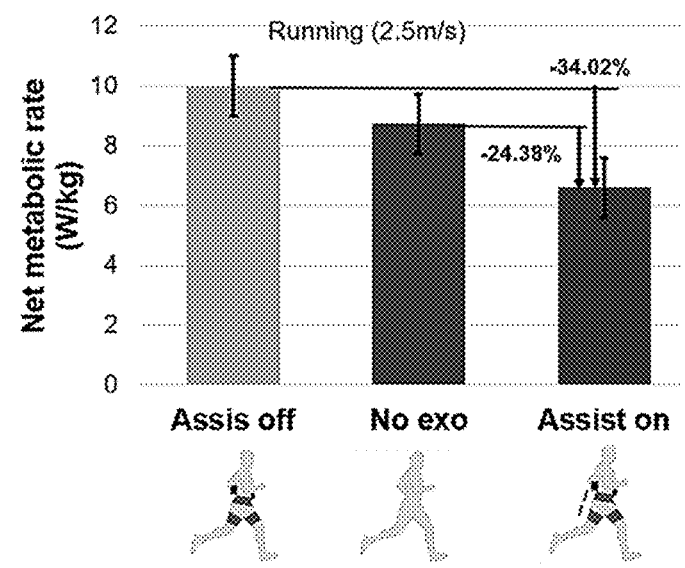
Figure 3E:
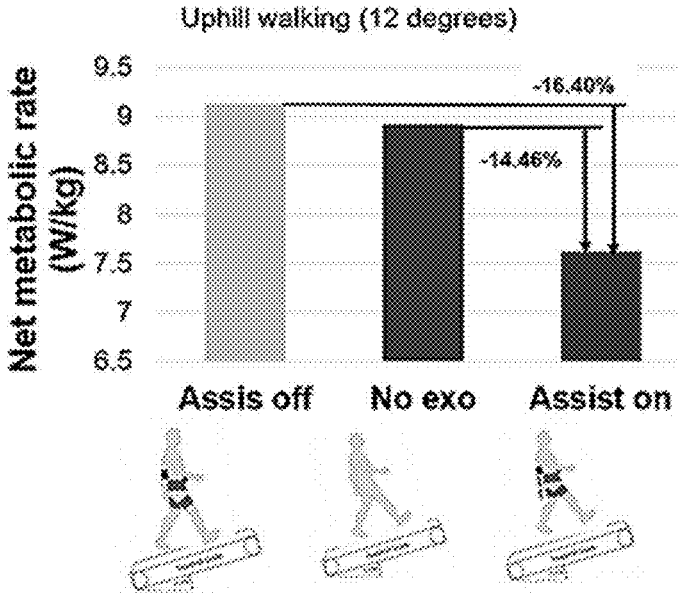
Figure 3F:
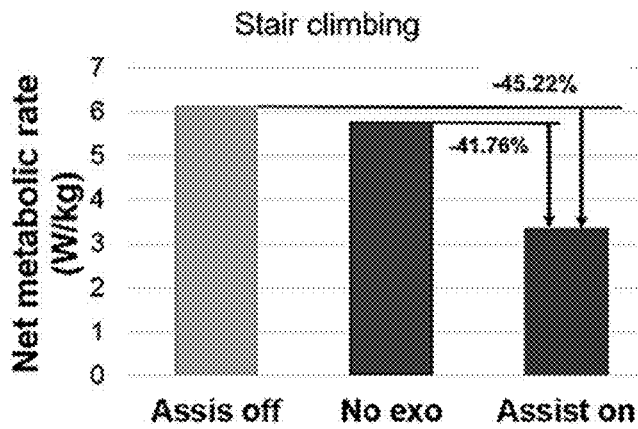
Figure 3F:
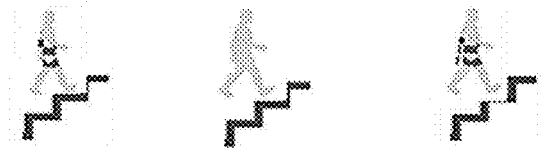

Evaluation of metabolic rate reduction during walking and running. Six subjects participated in the experiment to evaluate the performance of the hip exoskeleton during walking and running. Optimized and continuous assistance substantially improved energy economy in walking and running for all participants, confirming the effectiveness of the method. Metabolic rates were examined for level walking at 1.25 m/s (FIG. 3A), 0.75 m/s (FIG. 3B), 1.75 m/s (FIG. 3C), for level running at 2.5 m/s (FIG. 3D), 12% uphill walking at 1.5 m/s (FIG. 3E) and stair climbing at 65 steps/min (FIG. 3F) during the treadmill physiological and biomechanical testing protocol. Optimized assistance significantly reduced the metabolic cost of walking, energy cost reductions, with an average reduction of 18.6%. By the same measure, the same control policy was also applied in the running condition, the average reduction has been 24.38% compared with no exoskeleton condition, which can demonstrate the approach accurately continuous biological hip moments and generalized well to a variety of ambulatory tasks just using kinematics sensory input. Variability was primarily due to differences between participants.

Systems and Methods

Figure 4:
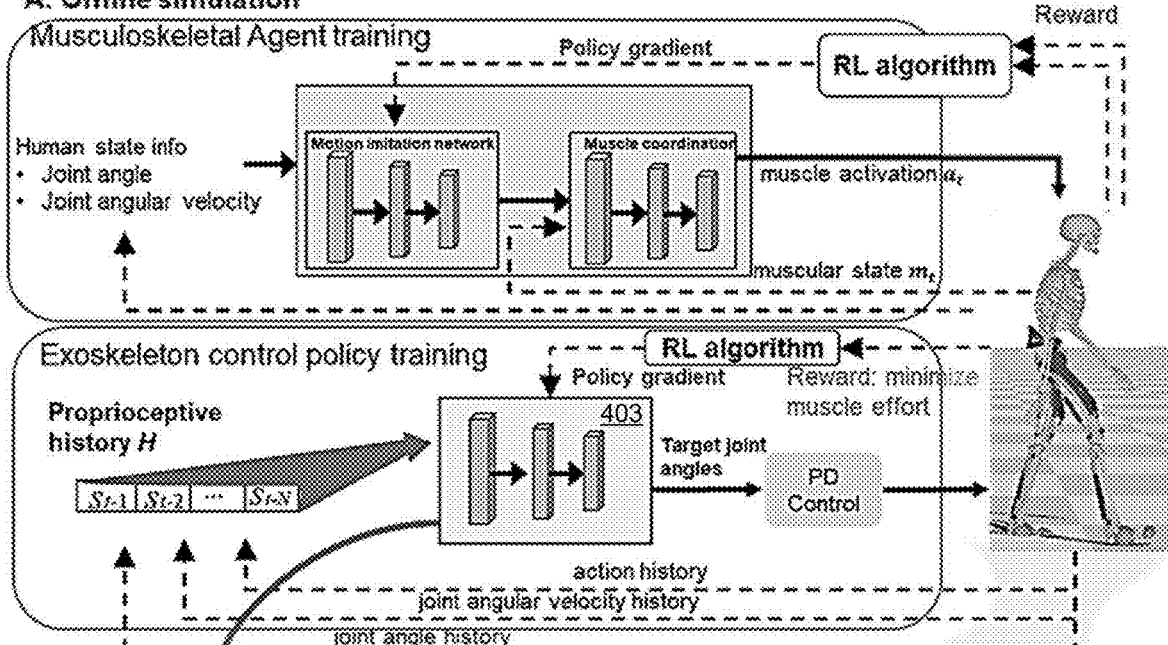
FIG. 4 illustrates an example of an offline training approach for the control approach, in accordance with various embodiments of the present disclosure.
Figure 4:
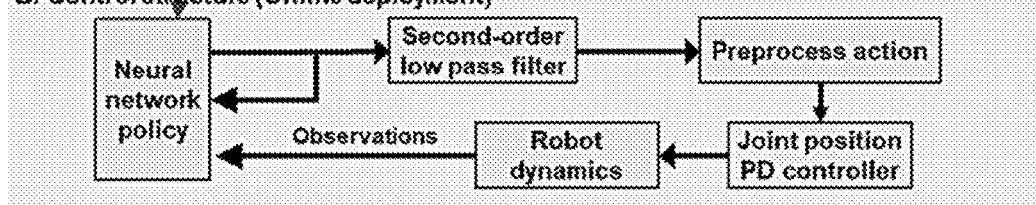

FIG. 4 illustrates an overview of the offline training approach. A decoupled offline training approach based on the deep reinforcement learning method is proposed, which can learn a continuous control policy for the exoskeleton in a given IMU input state that can minimize muscle effort and without any phase estimation and control parameters tuning. The offline training approach includes a musculoskeletal agent training and exoskeleton control policy training in offline simulation as shown in upper section (A) of FIG. 5. The goal of the musculoskeletal agent training is to control a 3D muscle-actuated human agent to do multiple activities, like walking, running and stair climbing. This human muscle-actuated control loop generates realistic human-exoskeleton interaction forces during versatile activities. A combination of a RL-based motion imitation network and a supervised learning-based muscle coordination network (shaded blocks 403) is devised to learn human muscle activation during the versatile activities. The goal of the exoskeleton control policy training is to learn a continuous and optimal torque control policy in a given kinematics input that minimize the human muscle effort under the realistic human-exoskeleton interaction forces from the human muscle-actuated control loop. Collectively, these three neural networks are jointly learned through simulations to achieve maximum rewards (minimize muscle effort) in deep RL. This decoupled offline training structure enables the trained continuous control policy of the exoskeleton in versatile activities to use only proprioception information of the exoskeleton regardless of the human uncertainties, which consequently facilitates easy deployment of the controller to the real exoskeleton without the need of human sensing. The details of the decoupled offline training structure will now be discussed.

Modeling exoskeleton dynamics and human musculoskeletal agent Musculoskeletal agent training. Predictive human muscle-actuated simulations based on RL have achieved some remarkable results. For example, the simulation comprises a high-fidelity human musculoskeletal model that represents the detailed joints and muscles around the upper and lower extremities and a deep neural network RL-based muscle actuated controller. It can simulate many aspects of human motions using deep RL, such as steady walking, running even jumping in a predictive manner. In FIG. 5, a highly fidelity human musculoskeletal simulation is designed to predict the human joint motion response and musculoskeletal loadings under the effect of the exoskeleton. In this simulation, the human musculoskeletal model contains highly detailed joints and muscles around the upper and lower extremities. It is composed of rigid skeleton fragments wrapped by geometrically stretchable muscles. The contraction and relaxation of these muscles lead to the rotation of joints, and therefore the motion of the whole body. In short, muscle activations regulated by the nervous system determine the length change of the muscle fibers and the change of muscle force.

The musculoskeletal model utilized in the simulation is around 170 cm tall, weighs 72 kg and consists of 50 degrees of freedom (DoFs), 8 revolute joints, 14 ball-and-socket joints and 284 musculotendon units. Each musculotendon unit was represented as a polyline that starts at the origin of the muscle, passes through a sequence of waypoints, and ends at the insertion. It generates an active muscle force through contraction and applies the force to the two bones of its origin and insertion. The location of a waypoint is shown in the linear blending skinning function below:

$$p = \Sigma w_j T_j x_j,$$

where $w_j$ is the skinning weight, $T_j$ is the transformation matrix of a bone, and $x_j$ is the coordinates.

The contraction muscle dynamics is simulated with a simplified Hill-type model. The Euler-Lagrangian equations for the human musculoskeletal dynamics using generalized coordinates can be described by:

$$M(q)\ddot{q} + c(q,\dot{q}) = J_m^T f_m + J_{ext}^T f_{ext},$$

where q is the vector of joint angles, $f_{ext}$ is the vector of external forces, and $f_m$ is the vector of muscles forces which is a function of muscle activations $a = (a_1, a_1, \ldots a_n)$ for all muscles. M(q) denotes the generalized mass matrix, and $c(\dot{q}, q)$ is Coriolis and gravitational forces. $J_m$ and $J_{ext}$ are Jacobian matrices which map the muscle and external forces to the joint space, respectively. When the muscle is fully relaxed (without active muscle contraction), the muscle just develops passive force because of its background elasticity. Tension f is generated by contraction of muscle fibers.

$$f=f(l,\dot{l},a)=a\cdot f_l(l)\cdot f_v(\dot{l})+f_p(l),$$

where l is the muscle length, $f_l(l)$ and $f_v(\dot{l})$ are force-length and forth-velocity functions and $f_p(l)$ is the passive force developed by muscle.

$$F=[a\cdot F_L(l)\cdot F_V(\dot{l})+F_P(l)]\times F_{max},$$

The force-length relationship $F_p$ is specified by an exponential function.

$$F_p = \frac{\frac{e^{k^p}\left(l^M - 1\right)}{e_0^M} - 1}{e^{k^p} - 1},$$

where $k^p$ is a shape factor and set to 4, $e_0^M$ is passive muscle strain and set to 0.6. In this paper, the active muscle contraction of the human operator is not considered, since the operator could be a patient suffering from spinal cord injury or stroke, with very limited or no control of his or her own body. Nonetheless, the passive muscle forces produced from all musculotendon units during movement are incorporated in the training to influence the human dynamics. Since the hip exoskeleton (as shown in FIG. 1) has straps around the hip and femur to constraint the human motion, linear bushing elements were used to simulate the interaction forces and moments between the human and exoskeleton at all strap locations. A linear bushing element represents a bushing connecting a frame fixed on the exoskeleton to a frame fixed on the human with linear translational and torsional springs and dampers.

Next, a musculoskeletal training framework using the deep neural network-based reinforcement learning is presented. To control a 3D musculoskeletal human agent to do multiple activities, like walking, running, stair climbing, the motion imitation controller was designed for the human agent through a Multi-Layer Perception (MLP) network that comprised three fully connected layers and a rectified linear unit (ReLU) as the activation function. The sizes of three layers were set to 256, 256 and 128, respectively. The motion imitation network was designed to make the human agent imitate a target walking, running or stair climbing motion, taking the human full body state (the kinematic states of the human, joint angle and angular velocity) as the input and its policy producing target human joint angle output during activities. PD control from these target angles generated desired human joint torque, which was passed to the second muscle coordination network.

The objective is to learn a control policy for the human agent that maximizes the discounted sum of reward:

$$\pi^*=\text{argmax}_\pi E_{r\sim p(\tau|\pi)}[\Sigma_{t=0}^{T-1}\gamma^t r_t],$$

The reward function $r_{human}=w^p r_p+w^e r_e+w^{cop}r_{cop}+w^\tau r_\tau+w^{as}\cdot r_{as}$ was designed as the weighted summation of multiple sub-rewards to encourage the control policy to imitate a target motion (walking, running and stair climbing) while maintaining balance with robustness. w denotes the corresponding weight for each sub-reward. The imitation rewards $(r_p, r_e)$ are designed to encourage the human agent to minimize the difference between the current and reference motions in terms of the joint positions and $p_{human}$ end-effector positions $x_{human}$.

$$r_p=\exp(-\sigma_p\Sigma_j\|\hat{p}_{human}^j-p_{human}^j\|^2),$$

$$r_e=\exp(-\sigma_e\Sigma_j\|\hat{x}_{human}^j-x_{human}^j\|^2),$$

where j is the index of joints, $(\hat{p}_{human}, \hat{x}_{human})$ are the reference joint and end-effector positions. This reward is to encourage the controller to predict an action that will improve the balance and robustness of the human's motion. The movement of system CoP is an important indicator of system stability and balance, and this reward is to motivate the current CoP position to stay inside a stable region S around the center of the foot support.

$$r_{cop}=\{\exp(-\sigma_{cop}\Sigma_j\|D(c_{cop},S)\|^2, \text{ if } c_{cop}\in S)0, \text{ if } c_{cop}\notin S,$$

where $D(\cdot, \cdot)$ is the Euclidean distance between CoP and the center of S. The reward $r_{as}$ encourages smooth action prediction by penalizing the second order finite difference derivatives of the actions.

$$r_{as}=\exp(-\sigma_{as}\|(a_{human})_t-2(a_{human})_{t-1}+(a_{human})_{t-2}\|^2),$$

The output of the neural network predicts the human joint target positions (action). The human joint target positions are specified as PD targets and the final PD-based torques applied to each joint are calculated as $$\tau=k_p(a_{human}-p_{human})-k_v\dot{p}_{human},$$

where $p_{human}$ denotes the human joint angle. $k_p$ and $k_v$ are the proportional gain and differential gain, respectively. The muscle coordination network in FIG. 4 is constructed to coordinate activations of all muscles to produce the desired human joint torque as close as possible. The muscle coordination network is a deterministic policy that outputs the muscle activations am from the current muscle state to minimizing the differences between the muscle generated acceleration and the desired joint acceleration. The problem is formulated into the supervised learning-based regression framework to learn collaboratively with the motion imitation network. This network policy maps desired human joint torque to muscle activations. The muscle state is defined to encode the information that convert muscle activations into muscle actuated joint accelerations. The loss function to minimize the discrepancy between the desired and actuated joint acceleration is designed as follows:

$$\text{loss}=E\|\ddot{q}_d-Ka(\varphi)-b\|^2+w_a\|a\|^2,$$

where $w_a$ is a weight, and a is the muscle activations. The muscle coordination network is implemented as a MLP network that comprises four fully connected layers. Both the tanh and ReLU nonlinear function were used at the output layer to enforce the muscle activations in the normalized range [0,1].

Deep RL-based hip exoskeleton Policy training. A continuous control policy offline training was proposed for the exoskeleton as shown in the middle section (A) of FIG. 5, making the robot have the capability of minimizing human muscle effort without gait phase estimation and control parameters tuning. The exoskeleton control policy network is implemented as a Multi-Layer Perception (MLP) network that comprises three fully connected layers and ReLU as the activation function. The sizes of three layers are set to 256, 256 and 128, respectively. At every time step t, the neural network takes the proprioceptive history (e.g., joint angle history and angular velocity history in three previous timesteps) as the input, the output of the neural network and predicts the exoskeleton joint target positions. To obtain smooth motions, the output from the control policy network is first processed by a second low pass filter before being applied to the exoskeleton. Moreover, we apply preprocessed actions (output) can be applied that are linearly interpolated from two consecutive filtered actions during each time step. Then the preprocessed actions are specified as PD targets and the final PD-based torques applied to each joint are calculated as:

$$\tau = k_p(a_{exo} - p_{exo}) - k_v \dot{p}_{exo}.$$

The objective is to learn a continuous control policy of the exoskeleton that maximizes the discounted sum of reward:

$$\pi^* = \mathrm{argmax}_\pi E_{r \sim p(\tau|\pi)}[\Sigma_{t=0}^{T-1} \gamma^t r_t],$$

and the reward function can be designed to minimize the human muscle effort:

$$r_{exo} = \exp(-\sigma_a \Sigma_j \|a_j\|^2),$$

where a denotes the muscle activation.

Learning with Proximal Policy Optimization (PPO). To train the neural networks and update the neural network parameters, the state-of-the-art policy gradient algorithm in RL known as Proximal Policy Optimization (PPO) can be used. Let $r_t(\theta)$ denote the probability ratio $$r_t(\theta) = \frac{\pi_\theta(a_e \mid s_e)}{\pi_{old}(a_e \mid s_e)} \hat{A}_t = E_t[r_t(\theta) \hat{A}_t],$$

where CPI refers to a conservative policy iteration. Without a constraint, maximization of $L^{CPI}$ would lead to an excessively large policy update; hence, PPO modifies the objective, to penalize changes to the policy that move $r_t(\theta)$ away from 1:

$$J^{CLIP}(\theta) = \hat{E}_t[\min(r_t(\theta)\hat{A}_t, \mathrm{clip}(r_t(\theta), 1-\epsilon, 1+\epsilon)\hat{A}_t)],$$

where $\epsilon$ is a hyperparameter, say e.g., $\epsilon=0.2$. The motivation for this objective is as follows. The first term inside the min is $L^{CPI}$. The second term, $\mathrm{clip}(r_t(\theta), 1-\epsilon, 1+\epsilon)\hat{A}_t$ modifies the surrogate objective by clipping the probability ratio, which removes the incentive for moving $r_t$ outside of the interval $1-\epsilon$, $1+\epsilon$. Finally, take the minimum of the clipped and unclipped objective, so the final objective is a lower bound (i.e., a pessimistic bound) on the unclipped objective. With this scheme, only ignore the change in probability ratio when it would make the objective improve, and include it when it makes the objective worse.

Sim-to-real transfer using exoskeleton dynamic randomization and muscle strength randomization. Due to the model discrepancy between the physics simulation and the real-world environment (or the reality or sim-to-real gap), the trained control policy usually performs poorly in the real environment. To improve the robustness of the controller against model inaccuracy and bridge the sim-to-real gap, the robot dynamics randomization and human muscles forces randomization can be incorporated in the training process to improve the performance of transferring simulated control policy to real world control. For the robot dynamics randomization, dynamics parameters of exoskeleton including the mass inertial, center of mass, friction coefficient and observation latency can be randomly sampled from a uniform distribution for each episode. In addition, the muscle dynamic randomization can be considered to incorporate human variability, making the trained control policy realize the individualized torque assistance. By simply scaling the maximum isometric forces in all lower limb muscles within prescribed ranges, different muscle forces of human-exoskeleton interactions due to the human variability can be simulated. By considering the exoskeleton dynamic randomization and muscle forces randomization, the objective in the equation is then modified to maximize the expected reward across a distribution of dynamics characteristics $\rho(\mu)$:

$$\pi^* = \mathrm{argmax}_\pi E_{\mu \sim \rho(\mu)} E_{r \sim p(\tau|\pi)}[\Sigma_{t=0}^{T-1} \gamma^t r_t],$$

where $\mu$ represents the values of the dynamics parameters that are randomized during training. By training policies to adapt to variability in environment dynamics, the resulting policy can be more robust when transferred to the real world.

Deployment on the real hip exoskeleton system. A joint-level PD controller can be used with low feedback gains on the joint-level actuator module of the hip exoskeleton. The dynamics of the actuators can contain multiple components in succession, as follows. First, the position command can be converted to the desired torque using a PD controller. Subsequently, the desired current can be computed using a PID controller from the desired torque. The desired current can then be converted to phase voltage using a Field-Oriented Controller (FOC), which produces the torque at the input of the transmission. After acquiring a parameter set for a trained policy from our hybrid simulation, the deployment on the real system was straightforward. A custom MLP implementation and the trained parameter set were ported to the robot's onboard PC. The low-level torque control architecture can be composed of an inner-loop control and an outer-loop control. The inner loop implements motor current control in the local motor controller. The outer loop implements the torque control in Arduino Due whose feedback signal is from motors, loadcells, and IMU-based detection.

Figure 5A:
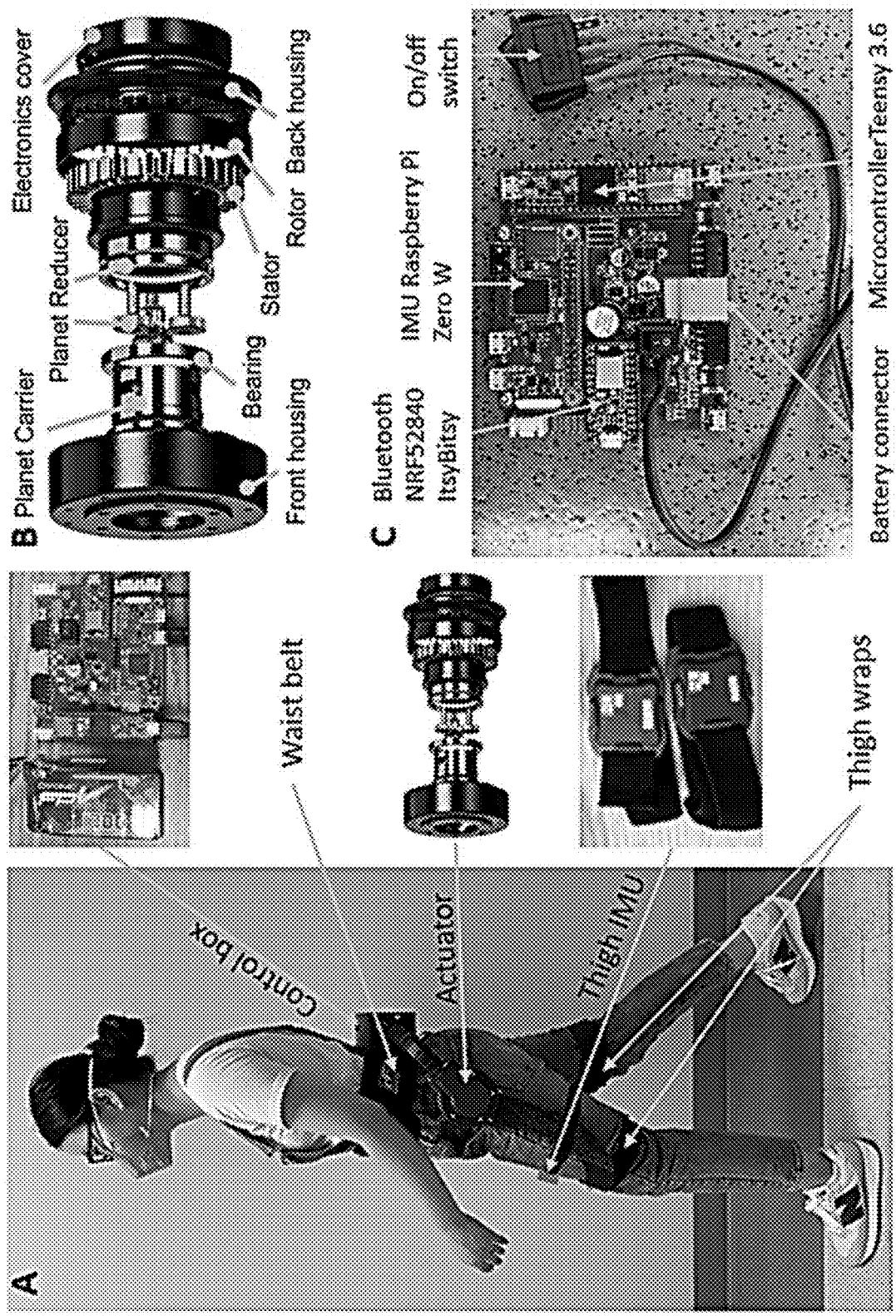
FIGS. 5A and 5B illustrate an example of a portable exoskeleton, in accordance with various embodiments of the present disclosure.
Figure 5B:
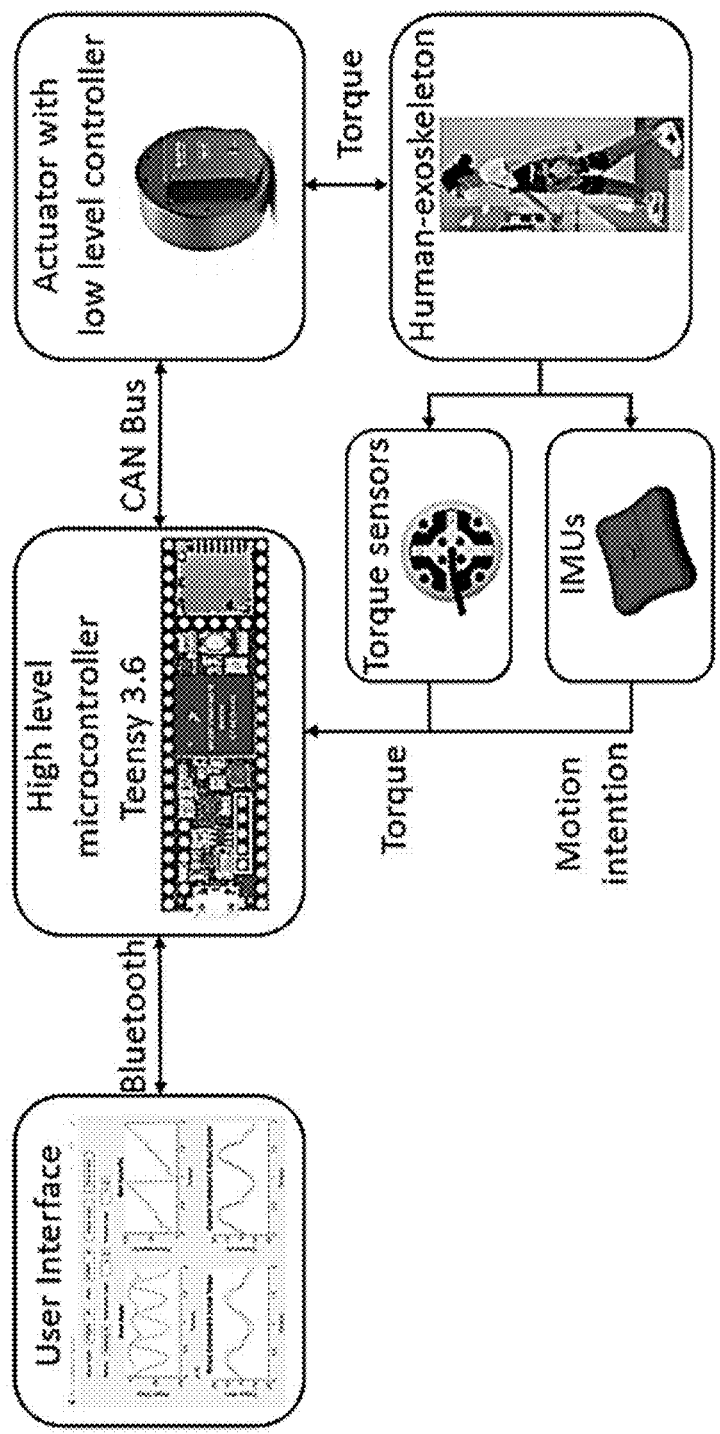

Portable exoskeleton. A portable exoskeleton for hip flexion and extension assistance was used as illustrated in the images of FIG. 5A. The textile components of the hip exoskeleton comprise a waist belt, two thigh braces and two inertial measurement unit (IMU) straps. The waist belt and thigh braces included woven fabric. The IMUs (LPMS-B2, ALUBI, China) were secured by elastic bands on the anterior part of each thigh. The design of the quasi-direct drive (QDD) actuation-based exoskeleton demonstrates mechanical versatility for being lightweight (3.1 kg overall mass), highly-backdrivable (Nm backdrive torque) with high nominal torque (Nm) and high control bandwidth (Hz). An exploded view of the actuator is shown in FIG. 5A. The electronic architecture of the exoskeleton facilitated high-level torque control, motor control, sensor signal conditioning, data communication, and power management, as shown in FIG. 5B. The low-level controller embedded in the smart actuator can measure the motor motion, current, velocity, and position. The high-level microcontroller (which can run on Teensy 3.6) can implement the stiffness-inspired continuous torque control. The microcontroller can acquire a joint angle from the wireless IMU sensors in real-time. A Bluetooth microcontroller (nRF52840 Express, Adafruit, USA) connected to the main controller can act as a transceiver to communicate with a desktop interface for real-time monitoring and data collection. A LiPo battery (450 g, 36V, 2500 mAh, 10-series-1-parallel) can power the knee exoskeleton. The battery power Pb was 90 Wh.

The controller was designed to deliver a consistent hip extension and flexion force profile during the gait cycle. An IMU-based algorithm detects the timing of maximum hip flexion based on changes in the sign of angular velocity from the thigh IMUs. Two IMUs are mounted on the anterior of both left and right thighs and they provide the motion information, including Euler angle, angular velocity, and acceleration at a frequency of 200 Hz. The hip joint angle is estimated based on the change in thigh segment angle relative to the standing position measurement.

Experiment-Free Versatile Optimization of Exoskeleton Assistance Via Learning-In-Simulation One challenge that impedes the development of wearable robot controllers is the substantial labor and time investments needed to optimize their performance on human subjects, stemming from the complicated human-robot interactions and inter-subject biomechanical variability. Simulation-based learning is a potential solution to replace intensive human tests. However, such simulations have not proven their benefits in experiments with a physical robot because they either do not incorporate controller design or do not consider human-robot interaction in the simulation. Another challenge in the development of exoskeleton controllers pertains to accommodating the distinct biomechanics of multi-gait human locomotion. State-of-the-art algorithms deploy two levels of discrete control that first classifies different locomotion activities and then discretizes the gait cycle into several phases. Different control laws are applied for each segmented gait phase, and each control law needs manual tuning of control parameters. Those methods are time-consuming and impractical, particularly for multiple activities. Reinforcement learning may help to enable smooth control thanks to its adaptability to a wide range of environments and situations. However, reinforcement learning methods are primarily studied to control robots and do not involve humans, which poses unique challenges for controller design.

Figure 6:
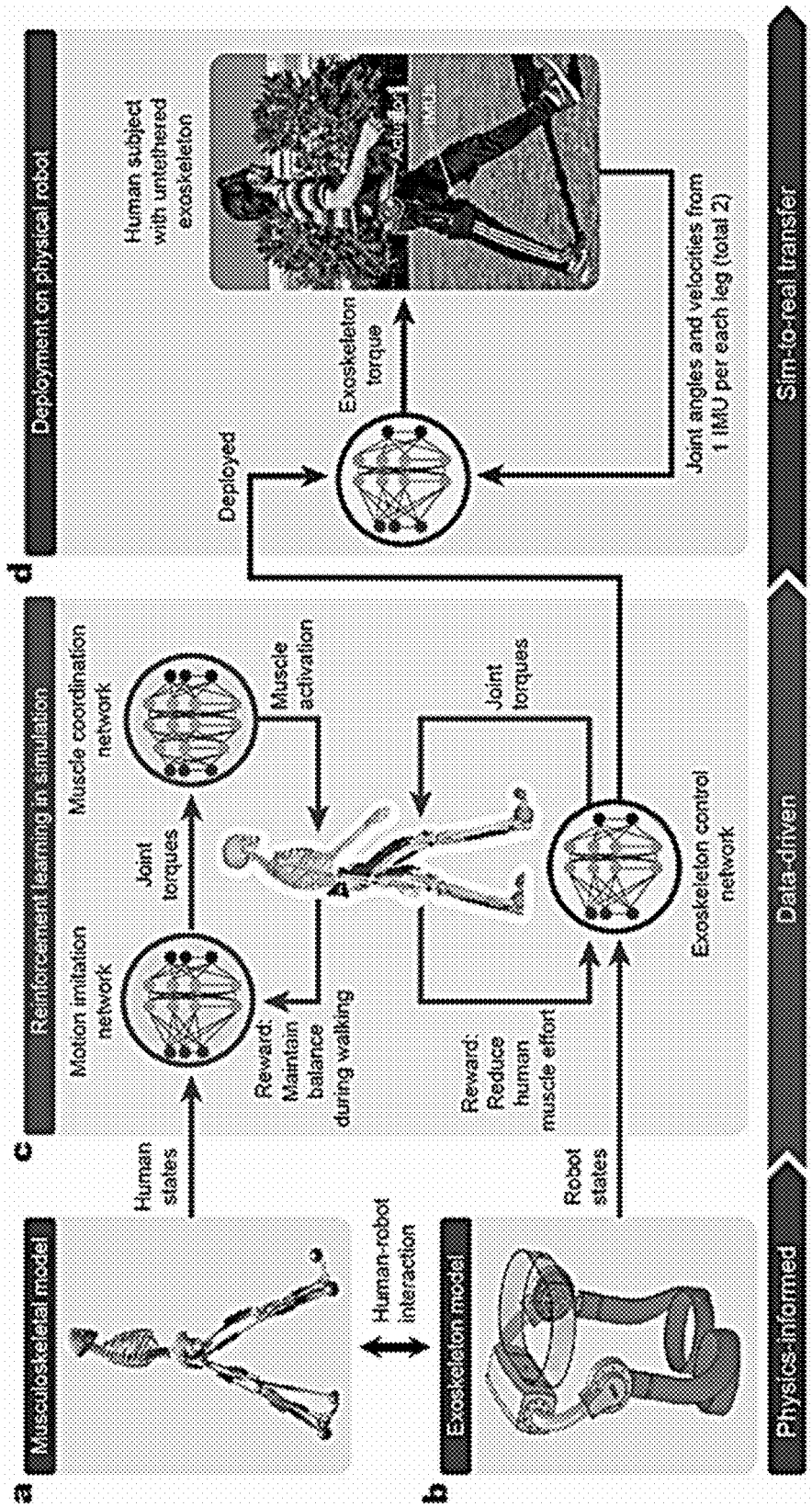
FIG. 6 illustrates an example of a learning-in-simulation framework, in accordance with various embodiments of the present disclosure.

In light of these challenges, a new experiment-free learning-in-simulation framework is presented that is data-driven and physics-informed, utilizing reinforcement learning to expedite the development of exoskeletons for multimodal locomotion assistance dramatically. To enable experiment-free learning, the data-driven components of the approach comprise three interconnected multi-layer perceptron (MLP) neural networks for motion imitation, muscle coordination, and exoskeleton control. FIG. 6 illustrates the learning-in-simulation framework. The human-robot interaction between a full-body musculoskeletal human model comprising 208 muscles and a physics-based exoskeleton model can be utilized. Reinforcement learning in a data-driven and physics-informed human-exoskeleton simulation comprises a motion imitation neural network for versatile activities, a muscle coordination neural network for replication of human muscular responses, and an exoskeleton control neural network for automatic generation of continuous assistance torque profiles. The learned controller can then be deployed in the physical system.

The framework can learn from human kinematic trajectory data for walking, running, and stair climbing, obtained from a publicly available motion capture dataset. Subsequently, the neural-network-based exoskeleton controller can evolve through millions of epochs of musculoskeletal simulation to improve human performance through the minimization of muscle activations. The training only needs to be run once for 8 hours on a graphics processing unit (GPU) (RTX3090, NVIDIA, USA) for the controller to learn effective assistance for all three activities as illustrated in reinforcement learning of FIG. 6. To improve simulation fidelity and training data-efficiency, the physics-informed components of the approach can incorporate a 50 degree-of-freedom (DoF) full-body musculoskeletal model with 208 skeletal muscles of lower and upper limbs, and the mechanical model of a hip exoskeleton. Notably, reinforcement learning is notoriously data hungry and is thus computationally expensive, especially when used in a human-robot interaction system for different activities. By incorporating the knowledge of physics models into the learning process, it is possible to guide the learning process and improve data efficiency. A linear elastic model can be used to simulate realistic human-robot interaction to facilitate controller design. With this proposed learning framework, the musculoskeletal model and exoskeleton controller can be trained simultaneously to produce high-fidelity physiological reactions with exoskeleton assistance and obtain a unified controller across activities, including walking, running, stair climbing, and their transitions purely in simulation as shown in FIG. 6.

The proposed framework enables end-to-end control of wearable robots as it maps the sensor inputs of a robot to assistive torque without any intermediate steps. The learned controller is computationally efficient and only comprises a 3-layer fully connected network, and thus it can be implemented on a microcontroller. The controller only requires kinematic measurement from wearable sensors (i.e., one inertial measurement unit (IMU) sensor per thigh) and accommodates three activities and can transition automatically without handcrafted control laws. This computationally efficient controller is possible because the control policy can be trained and optimized in simulation, which closely resembles the dynamics and biomechanics of the physical world. The controller also significantly reduces metabolic costs for the three activities.

Figure 7:
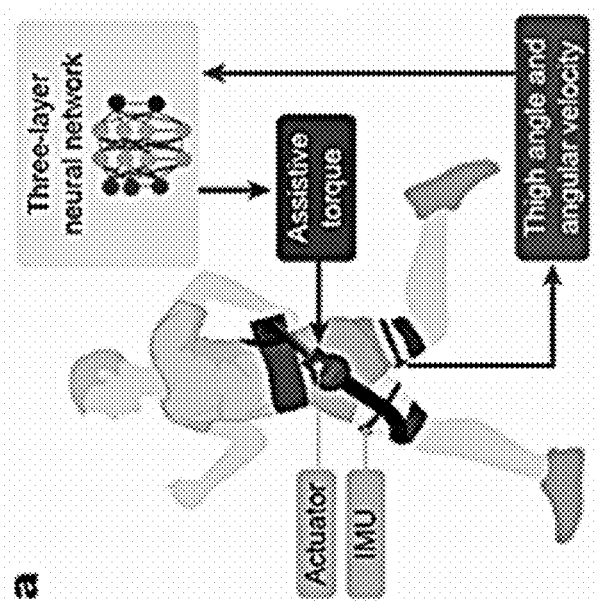
FIG. 7 illustrates an example of a generalizable and adaptive assistive torque produced by the learned controller, in accordance with various embodiments of the present disclosure.
Figure 7:
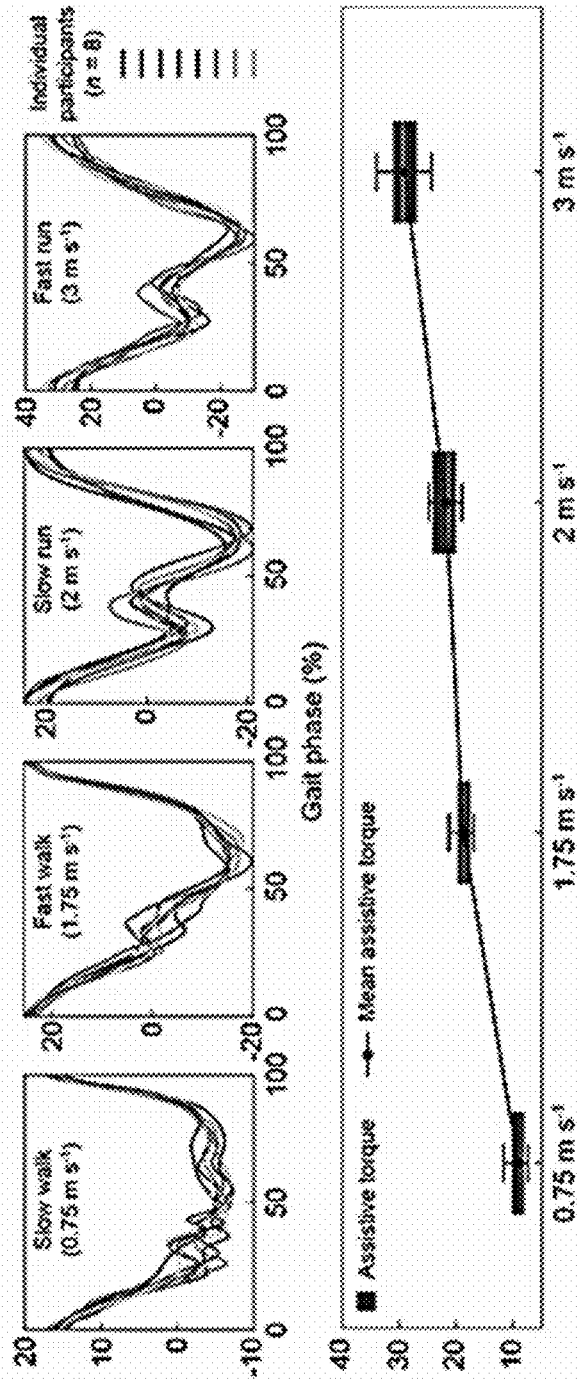

Adaptive versatile control via distinctive assistive torque profiles. To demonstrate the controller's ability to adapt to different locomotion activities, a treadmill experiment was conducted with eight subjects (five males, three females; 26.5±2.8 years old, 170.9±7.9 cm tall, 62.5±11.7 kg body weight) for walking and running at three different speeds. The weights and biases in the controller network were taken directly from the simulation, and the inputs were real-time thigh angles and angular velocities measured from the one IMU sensor mounted on each thigh as well as previous kinematic states from the last three timesteps. These robot sensor inputs are used to decode human intention and generate torque commands to each side of the hip exoskeleton. FIG. 7 illustrates an example of the generalizable and adaptive assistive torque by the learned controller showing a schematic diagram of the experimental setup. The controller comprises a 3-layer neural network and is implemented on a desktop computer running Simulink Realtime. To facilitate comparison with the literature, treadmill experiments were conducted for slow walking (0.75 m s$^{-1}$), normal walking (1.25 m s$^{-1}$), fast walking (1.75 m s$^{-1}$), slow running (2 m s$^{-1}$), normal running (2.5 m s$^{-1}$), and fast running (3 m s$^{-1}$). We chose to test across gait speeds to demonstrate the generalizability of the control policy. FIG. 7 shows assistive torque profiles for walking at slow (0.75 m s$^{-1}$; first plot from the left) and fast (1.75 m s$^{-1}$; second plot from the left) speeds and running at slow (2 m s$^{-1}$; third plot from the left) and fast (3 m s$^{-1}$; fourth plot from the left) speeds as a function of gait phases. Each line represents the assistance profile of one of the eight participants averaged across around 30 strides. The assistive torque generated by the controller learned in simulation is adaptive to walking and running at different speeds and the assistive torque profile exhibited similar shapes with variability for each participant (n=8) in each activity. The magnitude of the torque profile between walking and running also increases with locomotion speeds, demonstrating its ability to provide synergistic assistance for activities with different intensities. The bottom plot shows maximum assistive torque for each activity. Center lines represent the median, box limits delineate $25^{th}$ and $75^{th}$ percentile, and whiskers reflect maximum and minimum values (n=8; individual participants).

Figure 8:
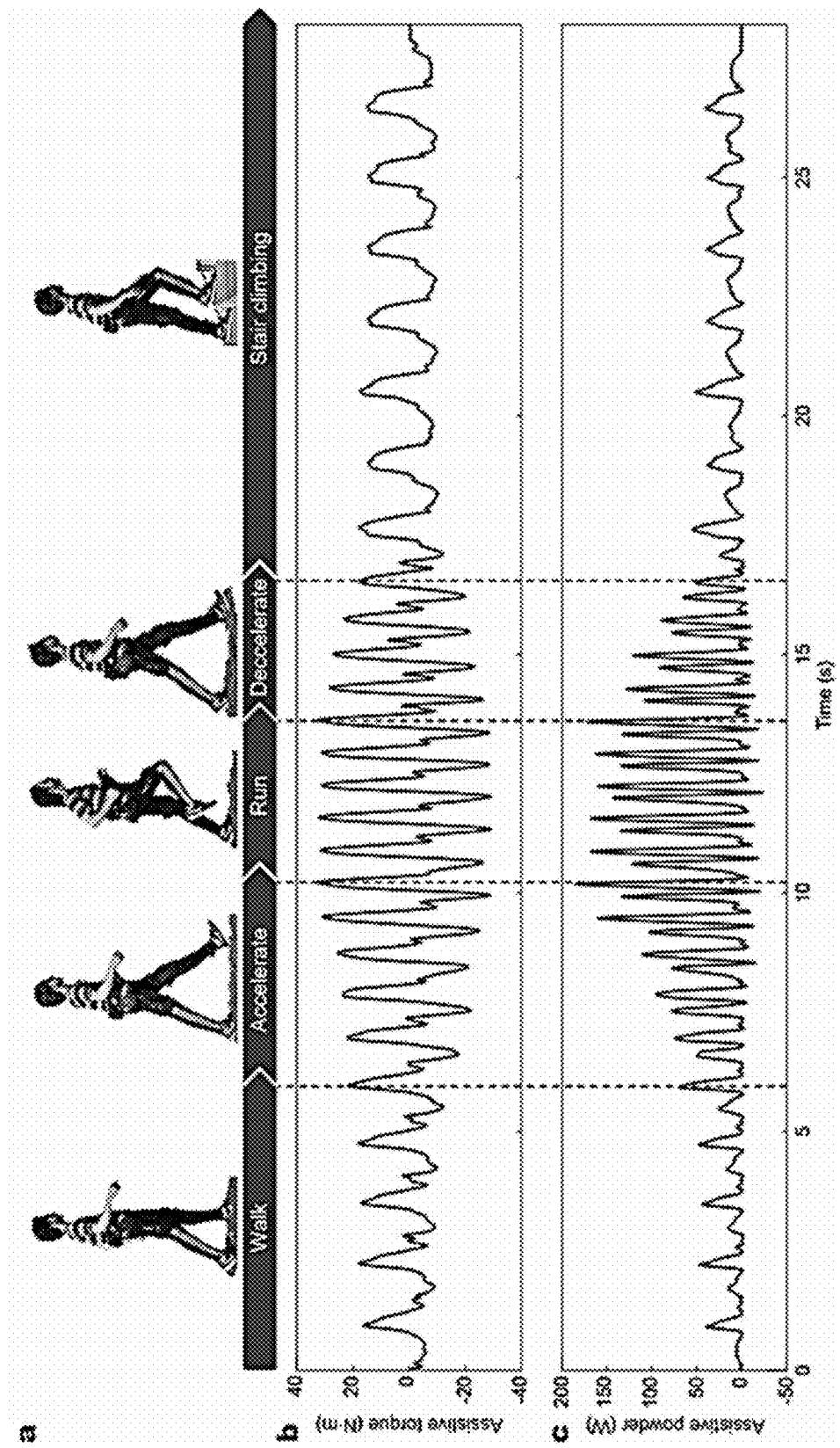
FIG. 8 illustrates an example of representative assistive torque during various activities and locomotion transitions, in accordance with various embodiments of the present disclosure.

Continuous assistive torque profile and smooth transitions for various activities. To demonstrate the controller's ability to generate smooth and synergistic assistance for three activities (walking, running, stair climbing) and their transitions, an activity-varying experiment was conducted in the real world. The participant starts from slow walking at approximately 0.8 m s$^{-1}$, accelerates to running at approximately 2 m s$^{-1}$, then decelerates and finally begins stair climbing (7 stairs) in a smooth manner as illustrated at the top of FIG. 8. The same neural network controller used in the treadmill experiment was implemented on a hierarchical mechatronics architecture with a high-level microcontroller (Raspberry Pi4, Raspberry Pi Foundation, UK) that sends the torque command to a low-level microcontroller (Teensy 4.1, PJRC, USA) located in a waist-mounted control box. The torque profile during walking, running, and stair climbing exhibited a distinct autonomous change in the profile shape as well as the magnitude of the assistance torque as shown in the upper plot of FIG. 8. The exoskeleton mechanical power also varied with the locomotion intensity as shown in the lower plot of FIG. 8, demonstrating the ability of the controller to provide synergistic assistance to the user.

Figure 9:
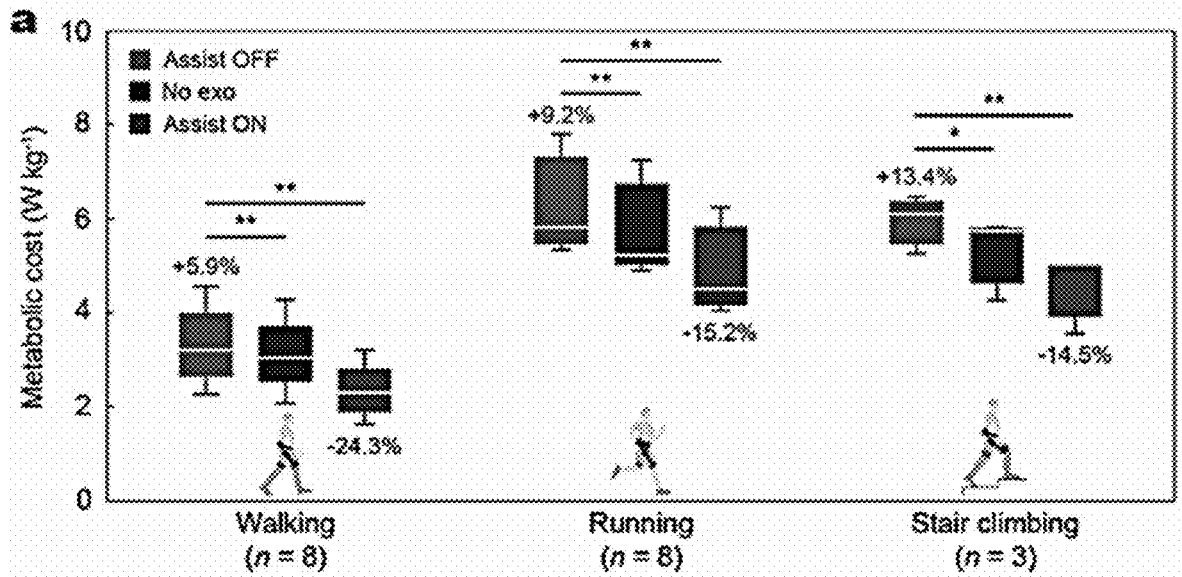
FIG. 9 illustrates an example of reduction in metabolic rate produced by control of the exoskeleton, in accordance with various embodiments of the present disclosure.

Versatile assistive control for various activities with metabolic rate reduction. Metabolic rate is one important metric used to evaluate human performance during exoskeleton-assisted locomotion. The robotic assistance substantially improved the energy economy of multiple participants during walking (n=8), running (n=3), and stair climbing (n=3) for all participants, confirming the effectiveness of the controller. FIG. 9 shows the average net metabolic rate for level walking at 1.25 m s$^{-1}$, running at 2.5 m s$^{-1}$, stair climbing at 65 steps min$^{-1}$ under three conditions (assist-on, assist-off, and no-exoskeleton). During level walking at 1.25 m s$^{-1}$ on the treadmill for 5 min, the net metabolic rate (last 2 min) for the No-exo condition of 3.11±0.25 W kg$^{-1}$ is reduced to 2.35±0.19 W kg$^{-1}$ for the Assist-on condition (mean±SEM). The metabolic rate reduction of the Assist-on conditions compared with the No-exo conditions ranges from 19.5% to 30.8%, with an average of 24.3%. During level running at 2.5 m s$^{-1}$ on the treadmill for 5 min, the net metabolic rate (collected for the last 2 min) for the No-exo condition of 5.78±0.60 W kg$^{-1}$ is reduced to 4.91±0.55 W kg$^{-1}$ for the Assist-on condition (mean±SEM). The metabolic rate reduction of the Assist-on conditions compared with the No-exo conditions ranges from 13.9% to 17.7%, with an average of 15.2%. During stair climbing at 65 steps min$^{-1}$ on a step mill for 5 min, the net metabolic rate (collected for the last 2 min) for the No-exo condition of 5.26±0.41 W kg$^{-1}$ is reduced to 4.51±0.39 W kg$^{-1}$ for the Assist-on condition (mean±SEM). The metabolic rate reduction of the Assist-on conditions compared with the No-exo conditions ranges from 13.1% to 16.2%, with an average of 14.5%. Collectively, these are the highest metabolic rate reduction among the previous literature with portable hip exoskeletons for walking, running, and stair climbing.

Study Discussion

In the study, the participants provided positive feedback on the exoskeleton for its usability and comfort during testing. For wearable robotic devices to gain widespread acceptance, their usability, comfort, and functionality for everyday activities are critical factors, as affirmed by the participants. The System Usability Scale (SUS) is the most frequently used questionnaire to measure usability. The exoskeleton garnered a SUS score of 77, surpassing the average score of 68 (the center of the Sauro-Lewis curved grading scale). The participants found the exoskeleton to be gentle on their skin and clothing, devoid of any irritations, abrasions, or wear and tear. Its ease of donning and secure fit, coupled with a manageable weight, further contribute to a positive user experience.

Figure 10:
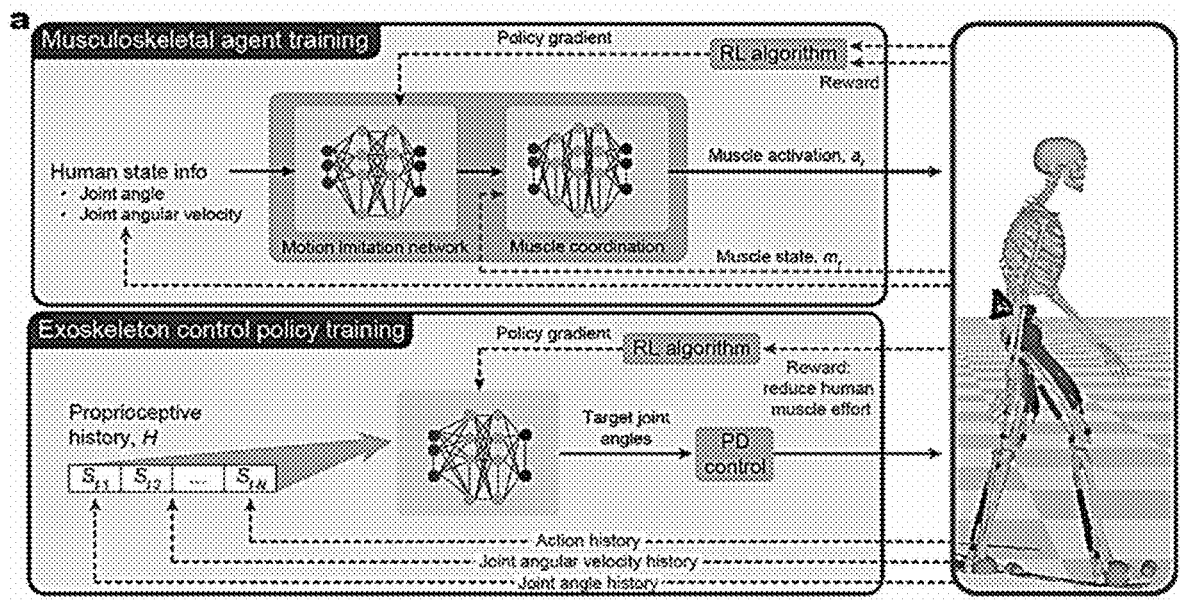
FIG. 10 illustrates an example of an learning-in-simulation architecture and the control structure for online deployment, in accordance with various embodiments of the present disclosure.
Figure 10:
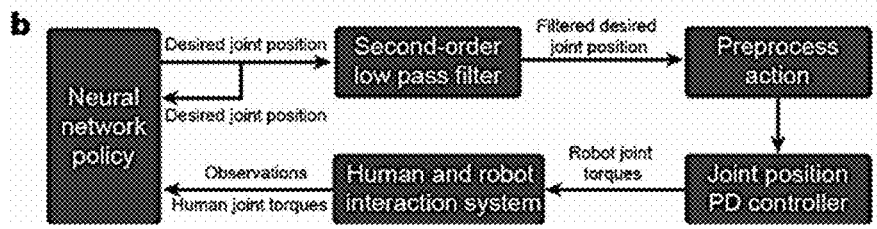

A challenge in the development of simulation-to-reality (sim2real) methods for wearable robots stemmed from considering both the human and the robot as well as the formidable sim2real gap that exists when the trained controller is deployed on physical robots. These issues can be addressed with three aspects of the learning-in-simulation framework. FIG. 10 schematically illustrates an example of the learning-in-simulation architecture and the control structure for online deployment. First, the control neural network can be designed to decouple the measurable states (i.e., wearable sensor inputs) and unmeasurable states (e.g., human joint moments and muscle activations) so that the neural network controller only relies on measurable states to directly generate the assistive torque profile. Second, the three neural networks in the framework can be trained simultaneously in the simulation so that the learning process stops only when the exoskeleton controller reduces human effort, and the virtual human model performs the desired locomotion while keeping balance. Third, domain randomization can be used on the kinematic properties of the physical models in the simulation so that the learned controller is generalizable to different human subjects, thus promoting personalized assistance.

The data-driven and physics-informed reinforcement learning method with musculoskeletal simulation provides a foundation for turnkey solutions in controller development for wearable robots. The simulation-trained end-to-end controller can generate continuous assistive profiles for walking, running, stair climbing, and their transitions without any experimental tuning or handcrafted control laws. The controller can produce immediate human energy reduction when directly deployed on physical hardware. This learning-in-simulation method is an important advancement in wearable robotics and potentially offers a scalable solution for exoskeletons, overcoming the need for time-consuming equipment for rapid deployment in the real world. As a generalized and efficient learning framework, this learning-in-simulation control method is applicable for a wide variety of exoskeletons including both portable and tethered ones, hip exoskeletons, knee exoskeletons, and ankle exoskeletons. In addition, the learning-in-simulation method can be personalized by training controllers with gait biomechanics data of each individual (which can be easily obtained with smartphone-based video motion capture by OpenCap) instead of the open public dataset used in this study. Since this generalized method can simulate both robotic devices and human biomechanics, digital twins can be created of the human and robot in the simulation. For human simulation, the method can model humans with various gait impairments, making it suitable to assist people with disabilities (e.g., stroke, osteoarthritis, cerebral palsy). For device simulation, the method can be extended to a wide variety of robotic assistive devices (e.g., exoskeletons and prostheses), aiding both able-bodied subjects with intact limbs and amputees.

This is the first work in wearable robotics to bridge the sim2real gap via learning in simulation of an end-to-end controller to immediately assist multimodal locomotion. Previous studies were limited by intensive human tests, handcrafted rules, and the inability to adapt to different activities. The success of the disclosed controller can be attributed to the following factors. First, the end-to-end method directly maps human kinematic input to robot assistance output without the need for discrete activity classification or gait phase segmentation. Second, the framework incorporates the robot controller in the simulation in concert with musculoskeletal modeling and thus closing the loop in simulation for the training process, whereas open-loop control is used in state-of-the-art study. Third, the method only needs low-dimensional sensor input (one IMU per leg) to infer high-dimensional human kinetics in 50 joints in the latent space that are not measurable. However, the controller also has limitations. When gaits that dramatically deviate from walking, running, or stair climbing (i.e., the training data used here from public dataset) occur, the controller may not be able to provide as effective assistance as in the normal case. If the gait deviates too much of the limit, the controller will set the assistance to zero and let the user take full control.

Methods

Physics-informed modeling of human muscle mechanics. Human muscle mechanics were modeled in the muscle coordination neural network to simulate realistic human musculoskeletal responses as human movements are primarily muscle-actuated. As the human musculoskeletal model is composed of rigid skeletal segments connected by geometrically stretchable muscles, the contraction and relaxation of these muscles lead to the rotation of joints, and therefore the motion of the whole body. Muscle activations that are regulated by the nervous system determine the change of the muscle fiber length, and further, the change of muscle force. The musculoskeletal model (shown in FIG. 6) was parametrized to be 170 cm in height, 72 kg in weight consisting of comprising 50 DoFs, 208 musculotendon units for the complete upper and lower body. The modeled DoFs included 8 revolute joints (tibia, foot, forearm) and 14 ball-and-socket joints (femur, talus, spine, torso, neck, head, shoulder, arm, and hand, each with 3 DoFs). Each musculotendon unit was represented as a polyline that began at the origin of the muscle, passed through a sequence of waypoints, and ended at the insertion point. An active muscle force was generated by each musculotendon unit through contraction which was applied between the two bones at its origin and insertion. When the musculotendon unit was fully relaxed (without active contraction), only passive force was produced due to its background elasticity. Muscle tension $f_M$ was generated by contraction of muscle fibers using a Hill-type model.

$$f_M = f_M(L, \dot{L}, a) = a \cdot f_L(L) f_v(\dot{L}) + f_p(L), \quad (1)$$

where L is the muscle length, a is the muscle activation, $f_L(L)$ and $f_v(\dot{L})$ are force-length and force-velocity functions, and $f_p(L)$ is the passive force developed by a muscle. The actual muscle force was given by:

$$F_M = f_m \cdot F_{max}, \quad (2)$$

where $F_{max}$ is the maximum isometric force that the muscle can generate. The force-length relationship $f_p$ was specified by an exponential function.

$$f_p = \frac{\frac{e^{k^p(L^M-1)} - 1}{e_0^M}}{e^{k^p} - 1}, \quad (3)$$

where $k^p$ is a shape factor, $e_0^M$ is the passive muscle strain.

Physics-informed modeling of human dynamics of motion imitation network. The human dynamic response was modeled to evaluate the influence of muscle forces and exoskeleton assistance on human movements. Euler-Lagrangian equations were used in generalized coordinates:

$$M(q)\ddot{q} + c(q, \dot{q}) = J_M^T F_M + J_{ext}^T F_{ext}, \quad (4)$$

where q is the vector of joint angles, $\ddot{q}$ is the vector of joint angular accelerations, $F_{ext}$ is the vector of external forces, and $F_M$ is the vector of muscle forces which is a function of muscle activations $a = (a_1, a_1, \ldots a_n)$ for all muscles. M(q) denotes the generalized mass matrix, and $c(q, \dot{q})$ comprises of Coriolis and gravitational forces. $J_M$ and $J_{ext}$ are the Jacobian matrices that map the muscle and external forces to the joint space, respectively.

Physics-informed modeling of human-robot interaction of exoskeleton control network. Human-robot interaction was modeled to evaluate the influence of the exoskeleton assistance on human movements. Since an exoskeleton was not perfectly fixed to the wearer's body due to soft wearables, the actual torque experienced by a wearer was not equal to the generated torque from the actuators. To simulate the interaction forces and moments at all wearable strap locations (as shown in FIG. 6), the 3D CAD model of the exoskeleton was imported to the simulation environment and connected it to the musculoskeletal model via linear bushing elements. A linear bushing element represented a bushing (B) connecting a cartesian coordinate frame fixed on the exoskeleton to a cartesian coordinate frame fixed on the human wearer with linear translational and torsional springs and dampers. During motion, the deviation of the two frames in the translational and torsional directions amidst the human and exoskeleton gave rise to bushing forces $F_B = [F_B^x, F_B^y, F_B^z]$ and moments $\tau_B = [\tau_B^x, \tau_B^y, \tau_B^z]$ which were given by:

$$F_B = k \cdot d + c \cdot \dot{d}, \quad \tau_B = \alpha \cdot \theta + \beta \cdot \dot{\theta}, \quad (5)$$

where $d = [d^x, d^y, d^z]$ is the vector of translational distances along the x, y, and z axes between the origins of the two frames and $\theta = [\theta^x, \theta^y, \theta^z]$ is the vector of x-y-z body-fixed Euler angles between the two frames. $k = [k^x, k^y, k^z]$ and $c = [c^x, c^y, c^z]$ represent the translational stiffness and translational damping along the x, y, and z directions, respectively. $\alpha = [\alpha^x, \alpha^y, \alpha^z]$ and $\beta = [\beta^x, \beta^y, \beta^z]$ represent the rotational stiffness and rotational damping around the x, y, and z axes, respectively. Different resistance strengths of straps were modeled along different directions. Specific values for each of these parameters were chosen based on empirical testing.

Figure 11:
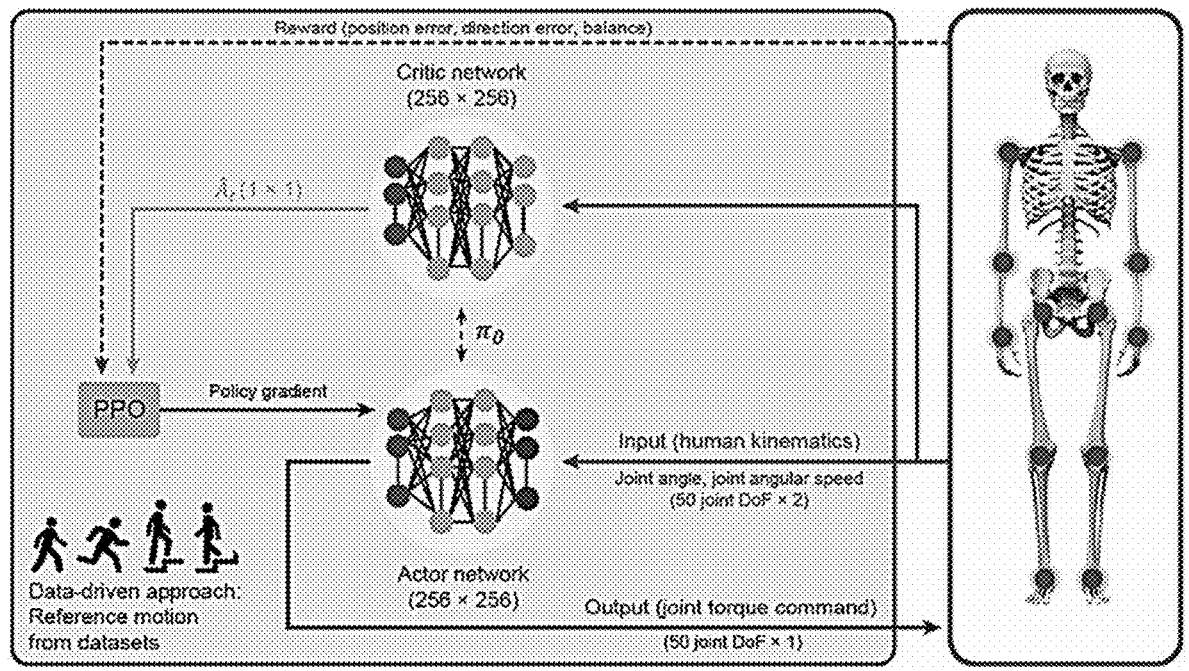
FIG. 11 illustrates an example of the autonomous learning framework of the reference motions, in accordance with various embodiments of the present disclosure.

Data-driven learning of motion imitation neural network. The motion imitation neural network $\pi_\varphi(a_m | s_m)$ (3 layers, 256×256×50 in size) was designed for the human musculoskeletal model to learn walking, running, and stair climbing motions in the simulation. FIG. 11 schematically illustrates an example of the autonomous learning framework of the reference motions (walking, running, stair climbing) from datasets based on human kinematics input and joint torque command output. The network took in the human full body human kinematic states $s_m$ (hip joint angle and angular velocity) as the input and produces target human joint angle profiles $a_m$ for each activity. The objective of the motion imitation neural network $\pi_\varphi$ was to learn an imitation policy for the human agent that maximizes the following discounted sum of reward:

$$\pi^* = \operatorname{argmax}_\pi E_{\tau \sim p(\pi)}[\Sigma_{t=0}^{T-1} \gamma^t r_t], \quad (6)$$

The reward function $r_{t,human} = w^p r_p + w^{root} r_{root} + w^{cop} r_{cop}$ was designed as the weighted sum of multiple sub-rewards to encourage the human musculoskeletal model to imitate a target motion (walking, running and stair climbing) while satisfying a few constraints. $r_p$, $r_{root}$, and $r_{cop}$ that represent the sub-rewards corresponding to joint position error, pelvis position error, and center of pressure of the musculoskeletal model (for detecting balance), respectively. w denotes the corresponding weight for each sub-reward. The imitation reward ($r_p$, $r_{root}$) was designed to encourage the human agent to minimize the position difference between the actual and reference motion from datasets in terms of the joint position $p_{human}$ and end-effector position $x_{human}$. Reference data was used in walking, running, and stair climbing from CMU Graphics Lab Motion Capture Database.

$$r_p = \exp(-\sigma_p \Sigma_j \| \hat{p}_{human}^j - p_{human}^j \|^2), \text{ and} \quad (7)$$

$$r_{root} = \exp(-\sigma_{root} \Sigma_j \| \hat{x}_{root}^j - x_{root}^j \|^2), \quad (8)$$

where j is the index of joints, ($\hat{p}_{human}$, $\hat{x}_{root}$) are the reference positions of the joints and root from the dataset. $p_{human}$, $x_{root}$ are the actual human joint angles.

The term $r_{cop}$ describes how well the controller maintains balance with the exoskeleton assistance in terms of movement of the whole system's center of pressure (CoP). A higher reward was generated when the CoP is within a physically equilibria region S around the center of the foot support:

$$r_{cop} = \exp(-\sigma_{cop} \| D(c_{cop}, S) \|^2), \text{ if } c_{cop} \in S; r_{cop} = 0, \text{ if } c_{cop} \notin S, \quad (9)$$

where $D(\cdot, \cdot)$ is the Euclidean distance between the center of pressure and the center of S. The output of this neural network $a_m$ is the desired joint angles at the 50 joints of the human musculoskeletal model to produce the desired locomotion. Following that, proportional-derivative (PD) control was employed to specify the desired joint angles, which directly correspond to the desired human joint torques $\tau_{human}$:

$$\tau_{human} = k_p(a_m - p_{human}) - k_v \dot{p}_{human}, \quad (10)$$

where $k_p$ and $k_v$ are proportional and derivative gains, respectively. The weights $w^p$, $w^{root}$, $w^{cop}$ are hyperparameters of the neural networks. Grid search is employed to find the optimal values for hyperparameters. It involves performing an exhaustive search on a specific hyperparameter configuration. For example, $w^p$ can be chosen from [0.25, 0.5, 0.75, 1], and $w^{root}$ can be chosen from [0.1, 0.2, 0.3, . . . , 0.9, 1]. The overall reward (7-9) can be assessed using all weight combinations and the set of weights identified that yielded the best overall performance during testing: $w^p = 0.75$, $w^{root} = 0.5$, $w^{cop} = 0.2$.

Figure 12:
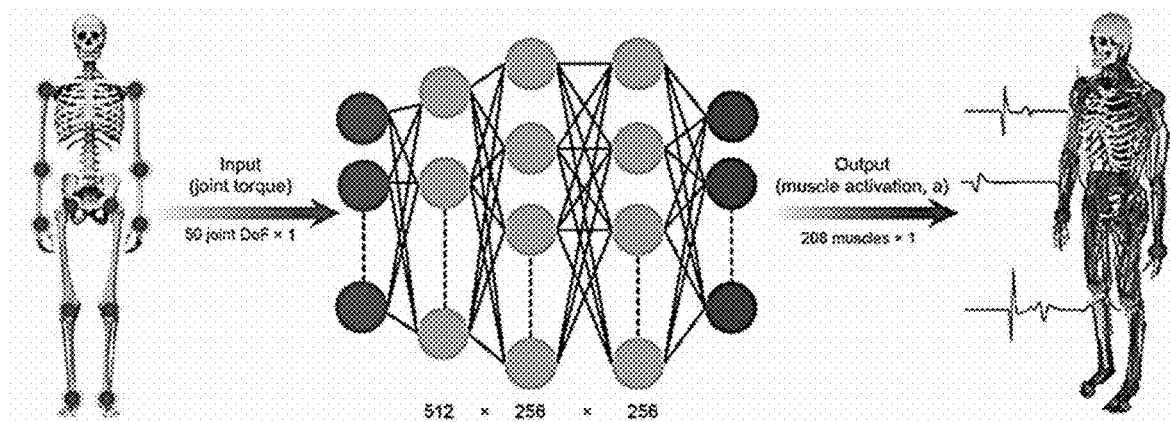
FIG. 12 illustrates an example of the muscle coordination neural network, in accordance with various embodiments of the present disclosure.

Data-driven learning of muscle coordination. The muscle coordination neural network $\pi_\theta(a)$ (4 layers, 512×256×256× 208 in size) was constructed to actuate the human musculoskeletal model through modulation of muscle activations. FIG. 12 schematically illustrates an example of the muscle coordination neural network based on human joint torque input and human muscle actuation output. The network took desired human joint torques from the motion imitation neural network as input and output activation values for each of the 208 muscles. The muscle activations a were applied to the musculotendon units over the entire body which in turn move the skeletal segments that elicit human movements. The objective of this network was to adjust the activations of each muscle to best reproduce the target joint torques.

To train the neural network, it was formulated into a supervised learning-based regression problem to learn collaboratively with the motion imitation neural network. A deterministic policy was employed to minimize the differences between the actuated joint accelerations and the desired human joint torques $\tau_{human}$ from the output of the motion imitation network $\tau_{human}$, which led to the following design of the loss function:

$$\text{loss} = E \| \tau_{human} - M^{-1}(q)(J_M^T F_M + J_{ext}^T F_{ext} - c) \|^2 + w_a \| a \|^2, \quad (11)$$

where $w_a$ is the weighting factor regularizing the muscle activation effort.

Figure 13:
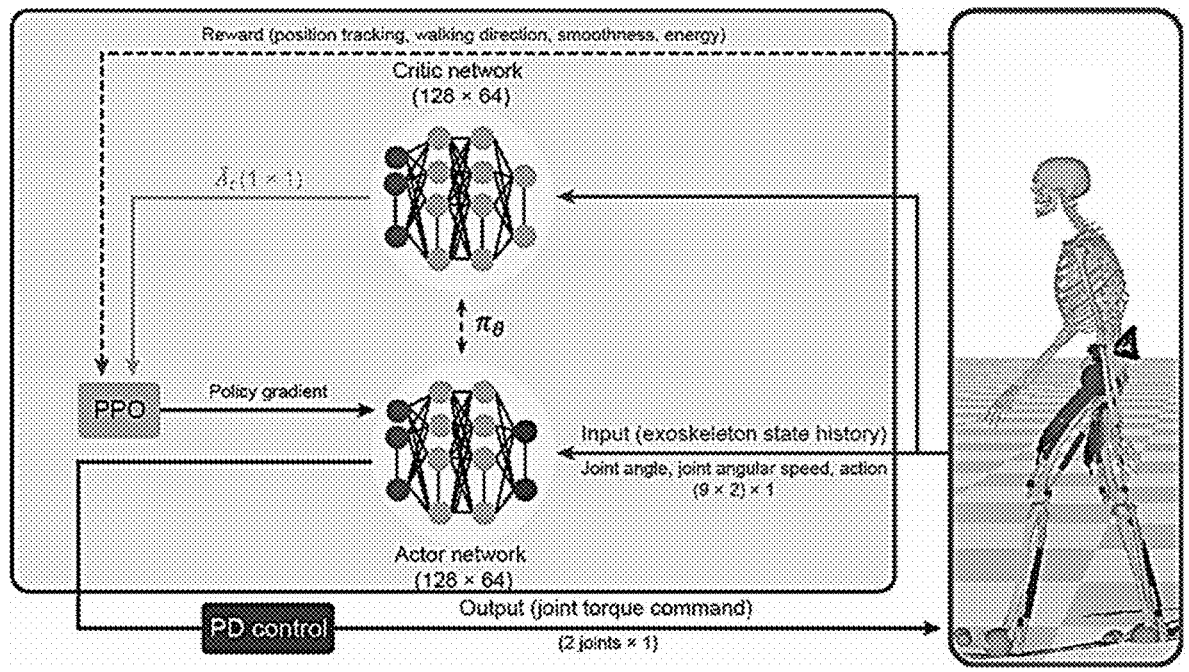
FIG. 13 illustrates an example of the exoskeleton control neural network, in accordance with various embodiments of the present disclosure.

Data-driven learning of exoskeleton control. The exoskeleton control neural network $\pi_\phi(a_e | s_e)$ (3 layers, 128×64×2 in size) produces high-level real-time assistance torque commands to assist the current activity. FIG. 13 schematically illustrates an example of the exoskeleton control neural network based on exoskeleton state history input and joint torque command output. The network takes proprioceptive history $s_e$ (joint angles and angular velocities from three consecutive previous timesteps) from the IMU sensor on each leg as input and consequently outputs joint target positions $a_e$ for the exoskeleton motors. The objective was to learn a continuous control policy for the exoskeleton that maximizes the following discounted sum of rewards to improve human performance:

$$\pi^* = \operatorname{argmax}_\pi E_{\tau \sim p(\pi)}[\Sigma_{t=0}^{T-1} \gamma^t r_t], \text{ and} \quad (12)$$

$$r_t = w^m r_m + w^\tau r_\tau + w^p r_p + w^{root} r_{root} + w^{cop} r_{cop} + w^{as} r_{as}. \quad (13)$$

The instantaneous reward $r_t$ comprises five sub-rewards: $r_m$ is the muscle work, $r_{as}$ is the action smoothness, $r_\tau$ is the exoskeleton energy consumption, w is the corresponding weight for each sub-reward. The sub-reward $r_{cop}$ was used to prevent a human model from falling down. $r_p$ and $r_{root}$ correspond to the same sub-rewards used in the motion imitation neural network. This ensures that the reward of the exoskeleton control neural network achieves its maximum only if the human model is able to follow the desired trajectory, thus facilitating sim2real transfer by incorporating human response. The reward $r_{as}$ encourages the controller to generate a smooth assistance profile to improve the subject comfort. The second-order finite difference derivatives of the actions $a_e$ (target joint angle) were penalized.

$$r_{as} = \exp(-\sigma_{as} \| (a_e)_t - 2(a_e)_{t-1} + (a_e)_{t-2} \|^2). \quad (14)$$

In the experiment, $w^m = 0.5$, $w^{as} = 0.2$, $w^\tau = 0.1$. To ensure smooth motion, the output from the trained controller neural network was first filtered by a second-order low-pass filter before being applied to the exoskeleton. Subsequently, to further obtain responsive corrections on the joint torques, a proportional-derivative (PD) control loop was employed where the preprocessed actions $a_e$ are specified as PD setpoints. The final PD-based torques applied to the hip joint are determined from:

$$\tau_{exo} = k_p(a_e - p_{exo}) - k_v \dot{p}_{exo}, \quad (15)$$

where $k_p$ and $k_v$ are proportional and derivative gains, respectively.

Closed-loop simultaneous training of three neural networks. A decoupled training scheme was developed using PyTorch where the exoskeleton neural network controller only needed measurable inputs from wearable sensors in the physical world (e.g., human joint angles and angular velocities), whereas the musculoskeletal model had access to more intricate information from the model which generally is not available in reality (e.g., the activation level of each muscle, real-time center of pressure (CoP), etc.). However, to ensure a causal relationship between the musculoskeletal model and the exoskeleton controller, sub-rewards related to muscle work and joint/pelvis position tracking error were incorporated in the reward function of the exoskeleton control neural network (12-13) so that it achieved high reward only if both trainings were successful. Such training setup ensured that the exoskeleton control policy incorporated human response during its own training process to facilitate real-world deployment.

It is a known challenge to transfer a trained controller from simulation to real-world settings while ensuring accuracy and behavior similar to that in the physical environment (e.g., individual human properties and robot properties). Typically, such attempts usually result in undesirable performance (e.g., ill-timed robotic assistance or unsafe action from the robot) which may in part be attributed to the discrepancy in the exoskeleton dynamics between real-world and simulation. To tackle this challenge and bridge the sim2real gap, the solution incorporated domain randomization, a machine learning technique that was proposed to facilitate bridging the sim2real gap for object localization. First, robot dynamics parameters and musculoskeletal dynamics parameters were perturbed to enhance the robustness of the trained policy to this discrepancy. Dynamics properties of the exoskeleton (e.g., mass, inertia, center of mass, friction coefficient, observation latency) were randomly sampled from a uniform distribution in each episode to account for the modeling error. Second, for musculoskeletal dynamics parameters, the maximum isometric force in the Hill-type model (1-3) of all lower limb muscles was randomized within a prescribed range to account for muscle strength variability among each individual. Combining these two approaches, the optimization objective in (12) was then modified to maximize the expected reward across a distribution of dynamics characteristics $\rho(\mu)$:

$$\pi^* = \mathrm{argmax}_\pi E_{\mu \sim \rho(\mu)} E_{\tau \sim p(\pi)} [\Sigma_{t=0}^{T-1} \gamma^t r_t] \tag{16}$$

where $\mu$ represents the perturbed dynamics parameters values in the simulation. This intentionally introduced variability in the simulation, thus enabling the trained controller to be more robust against heterogeneous real-world conditions.

Deployment of the learned controller. The efficiency and versatility of the trained controller were evaluated with the portable hip exoskeleton in both indoor and outdoor settings. The hip exoskeleton has a total weight of 3.2 kg and can produce a peak torque of 36 N·m. For fixed-speed experiments on the treadmill, the exoskeleton was connected to a Target PC with Simulink Real-time system (MathWorks, Natick, USA) to collect as much data as possible (e.g., human kinematics, robot states, output of each neural network, metabolic rate data). The Simulink system ran both a high-level exoskeleton control neural network and a low-level motor control module. The deployed exoskeleton control network in the Simulink model imported the network parameters directly from the simulation. For outdoor experiments with three activities, we implemented the same controller on portable electronics using a Raspberry Pi 4 microcontroller running high-level control in Python which sends the generated torque commands to a mid-level microcontroller (Teensy 4.1, PJRC, USA) that finally regulates the low-level motor control (see FIGS. 5A-5B).

An experiment-free method has been shown to learn a versatile control policy in simulation to drastically expedite the development of exoskeletons for multimodal locomotion assistance. The learning-in-simulation methodology leverages data-driven and physics-informed reinforcement learning to bridge the gap between simulation and reality without human-involved experiments. The learned controller can be deployed on a custom hip exoskeleton that automatically generates assistance across different activities with reduced metabolic rates by 24.3%, 15.2%, and 14.5% for walking, running, and stair climbing, respectively. As a generic and versatile learning framework, the methodology can offer a generalizable and scalable strategy for expedited development and broader dissemination of a wide variety of assistive robots for both able-bodied and mobility-impaired individuals.

Figure 14:
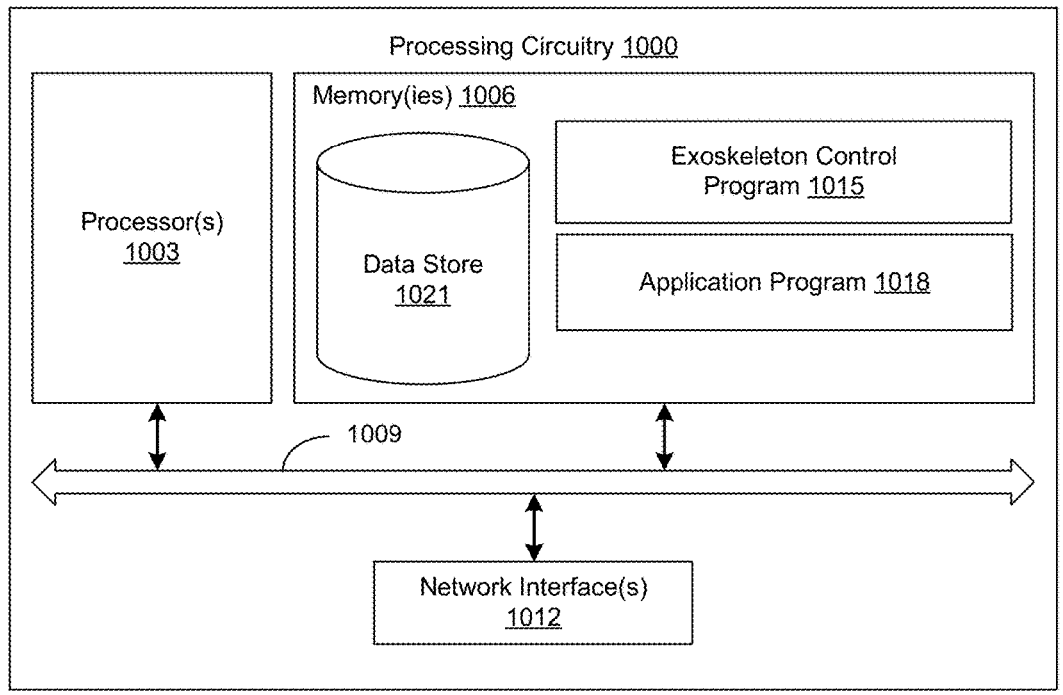
FIG. 14 is a block diagram illustrating an example of processing circuitry for implementing exoskeleton control, in accordance with various embodiments of the present disclosure.

Referring next to FIG. 14, shown is a schematic diagram illustrating an example of processing circuitry 1000 that can be used for control of exoskeletons such as, e.g., wearable robots or other exoskeleton applications, in accordance with various embodiments of the present disclosure. The processing circuitry 1000 can comprise one or more computing/processing device such as, e.g., a smartphone, tablet, computer, controller, etc. The processing circuitry 1000 can include processing circuitry comprising at least one processor circuit, for example, having a processor 1003 and a memory 1006, both of which are coupled to a local interface 1009. To this end, each processing circuitry 1000 may comprise, for example, at least one server computer or like device, which can be utilized in a cloud based environment. The local interface 1009 may comprise, for example, a data bus with an accompanying address/control bus or other bus structure as can be appreciated.

In some embodiments, the processing circuitry 1000 can include one or more network interfaces 1012. The network interface 1012 may comprise, for example, a wireless transmitter, a wireless transceiver, and/or a wireless receiver. The network interface 1012 can communicate to a remote computing/processing device or other components using a Bluetooth, WiFi, or other appropriate wireless protocol. As one skilled in the art can appreciate, other wireless protocols may be used in the various embodiments of the present disclosure. The network interface 1012 can also be configured for communications through wired connections.

Stored in the memory 1006 are both data and several components that are executable by the processor(s) 1003. In particular, stored in the memory 1006 and executable by the processor 1003 can be an exoskeleton control application 1015 which can utilize the most significant cell methodology as disclosed herein, and potentially other applications 1018. In this respect, the term "executable" means a program file that is in a form that can ultimately be run by the processor(s) 1003. Also stored in the memory 1006 may be a data store 1021 and other data. In addition, an operating system may be stored in the memory 1006 and executable by the processor(s) 1003. It is understood that there may be other applications that are stored in the memory 1006 and are executable by the processor(s) 1003 as can be appreciated.

Examples of executable programs may be, for example, a compiled program that can be translated into machine code in a format that can be loaded into a random access portion of the memory 1006 and run by the processor(s) 1003, source code that may be expressed in proper format such as object code that is capable of being loaded into a random access portion of the memory 1006 and executed by the processor(s) 1003, or source code that may be interpreted by another executable program to generate instructions in a random access portion of the memory 1006 to be executed by the processor(s) 1003, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores, and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, ultrasound or other devices. The processor 1003 may be of electrical or of some other available construction.

Although the exoskeleton control application 1015, and other various applications 1018 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the exoskeleton control application 1015, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the exoskeleton control application 1015, may be implemented and structured in a variety of ways. For example, one or more applications described may be implemented as modules or components of a single application. For example, the exoskeleton control application 1015 can include a wide range of modules such as, e.g., an initial model or other modules that can provide specific functionality for the disclosed methodology. Further, one or more applications described herein may be executed in shared or separate computing/processing devices or a combination thereof. For example, a plurality of the applications described herein may execute in the same processing circuitry 1000, or in multiple computing/processing devices in the same computing environment. To this end, each processing circuitry 1000 may comprise, for example, at least one server computer or like device, which can be utilized in a cloud based environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method, comprising:
   obtaining inertial measurement unit (IMU) sensor signals associated with an exoskeleton attached to a limb of a subject;
   generating an exoskeleton control signal in response to the IMU sensor signals, the exoskeleton control signal generated by a control policy neural network trained offline from the exoskeleton using musculoskeletal human modeling and exoskeletal modeling with dynamics randomization; and
   controlling joint torques of the exoskeleton exerted on the subject based upon the exoskeleton control signal.

2. The method of claim 1, wherein the IMU sensor signals comprise joint angle and joint angular velocity of the limb.

3. The method of claim 2, wherein the limb is a leg of the subject and the joint torques are associated with a hip joint.

4. The method of claim 1, wherein training of the control policy neural network comprises:
   training a motion imitation neural network and a muscle coordination neural network to simulate muscle activation, the training of the motion imitation neural network and the muscle coordination neural network based upon simulated joint angle and joint angular velocity corresponding to the simulated muscle activation; and
   simultaneously training the control policy neural network based upon the simulated joint angle and joint angular velocity.

5. The method of claim 4, wherein the training of the motion imitation neural network, the muscle coordination neural network, and the control policy neural network comprise reinforcement training.

6. The method of claim 1, wherein the exoskeleton comprises processing circuitry configured to control operation of the exoskeleton based upon the trained control policy neural network.

7. The method of claim 6, wherein the processing circuitry is configured to low pass filter the exoskeleton control signal prior to controlling the joint torques via a PD controller.

8. The method of claim 1, wherein the control policy neural network provides end-to-end continuous control of the exoskeleton over a range of operations.

9. The method of claim 8, wherein the range of operations comprise walking, running and squatting.

10. An exoskeleton, comprising:
    a support structure configured to interface with a limb of a user;
    an inertial measurement unit (IMU) sensor configured to sense the limb of the user;
    an actuator coupled to the support structure; and
    processing circuitry configured to:
       obtain IMU sensor signals associated with movement of the limb of the subject;
       generate an exoskeleton control signal in response to the IMU sensor signals, the exoskeleton control signal generated by a control policy neural network trained offline from the exoskeleton using musculoskeletal human modeling and exoskeletal modeling with dynamics randomization; and
       control joint torques of the exoskeleton exerted via the actuator based upon the exoskeleton control signal.

11. The exoskeleton of claim 10, wherein the IMU sensor signals comprise joint angle and joint angular velocity of the limb.

12. The exoskeleton of claim 11, wherein the limb is a leg of the user and the joint torques are associated with a hip joint.

13. The exoskeleton of claim 10, wherein training of the control policy neural network comprises:
    training a motion imitation neural network and a muscle coordination neural network to simulate muscle activation, the training of the motion imitation neural network and the muscle coordination neural network based upon simulated joint angle and joint angular velocity corresponding to the simulated muscle activation; and
    simultaneously training the control policy neural network based upon the simulated joint angle and joint angular velocity.

14. The exoskeleton of claim 13, wherein the training of the motion imitation neural network, the muscle coordination neural network, and the control policy neural network comprise reinforcement training.

15. The exoskeleton of claim 10, wherein the processing circuitry is configured to control operation of the exoskeleton based upon the trained control policy neural network.

16. The exoskeleton of claim 15, wherein the processing circuitry is configured to low pass filter the exoskeleton control signal prior to controlling the joint torques via a PD controller.

17. The exoskeleton of claim 10, wherein the control policy neural network provides end-to-end continuous control of the exoskeleton over a range of operations.

18. The exoskeleton of claim 17, wherein the range of operations comprise walking, running and squatting.

* * * * *